United States Patent [19]

Damouny et al.

[11] Patent Number: 4,713,750
[45] Date of Patent: Dec. 15, 1987

[54] MICROPROCESSOR WITH COMPACT MAPPED PROGRAMMABLE LOGIC ARRAY

[75] Inventors: Nabil G. Damouny, Sunnyvale; Min-Siu Huang, Mountain View; Dan Wilnai, Sunnyvale; Yeshayahu Mor, Cupertino, all of Calif.

[73] Assignee: Fairchild Camera & Instrument Corporation, Mountain View, Calif.

[21] Appl. No.: 666,215

[22] Filed: Oct. 30, 1984

Related U.S. Application Data

[63] Continuation-in-part of Ser. No. 481,061, Mar. 31, 1983, Pat. No. 4,573,118.

[51] Int. Cl.[4] .............................................. G06F 9/22
[52] U.S. Cl. .................................................. 364/200
[58] Field of Search ... 364/200 MS File, 900 MS File

[56] References Cited

U.S. PATENT DOCUMENTS 4,106,090 8/1978 Erickson et al. ................... 364/200

Primary Examiner—Raulfe B. Zache
Attorney, Agent, or Firm—Stephen J. Phillips; Kenneth Olsen

[57] ABSTRACT

A microprocessor with a multiplexer having its output coupled to the input of the instruction register for storing instructions to be executed and applying the bits of the instruction as the input signals to a mapping PLA. The inputs of the multiplexer are the information bus coupled to external pins to receive instructions either from external memory or from an external console, and the output of the ALU. The path from the output of the ALU to the input of the instruction register allows better self testing of the processor by iteself and self-generation of input/output instructions. This structure simplifies the processor by allowing console requests, instructions from memory and self generated instructions all to be stored in the same register, i.e., the instruction register, thereby eliminating the need for separate registers for each type of instruction. Further, this structure simplifies programming of repetitive I/O instructions for polling large numbers of I/O devices having sequential addresses in memory mapped I/O applications. That is, the microprocessor has the capability of generating its own I/O instructions from an operand coming in from memory such as by adding it to the contents of an index register and supplying the result to the instruction register through the ALU output, the ALU bus, and the multiplexer as the address of the particular I/O device to read from or write to.

6 Claims, 11 Drawing Figures

Microfiche Appendix Included
(8 Microfiche, 433 Pages)

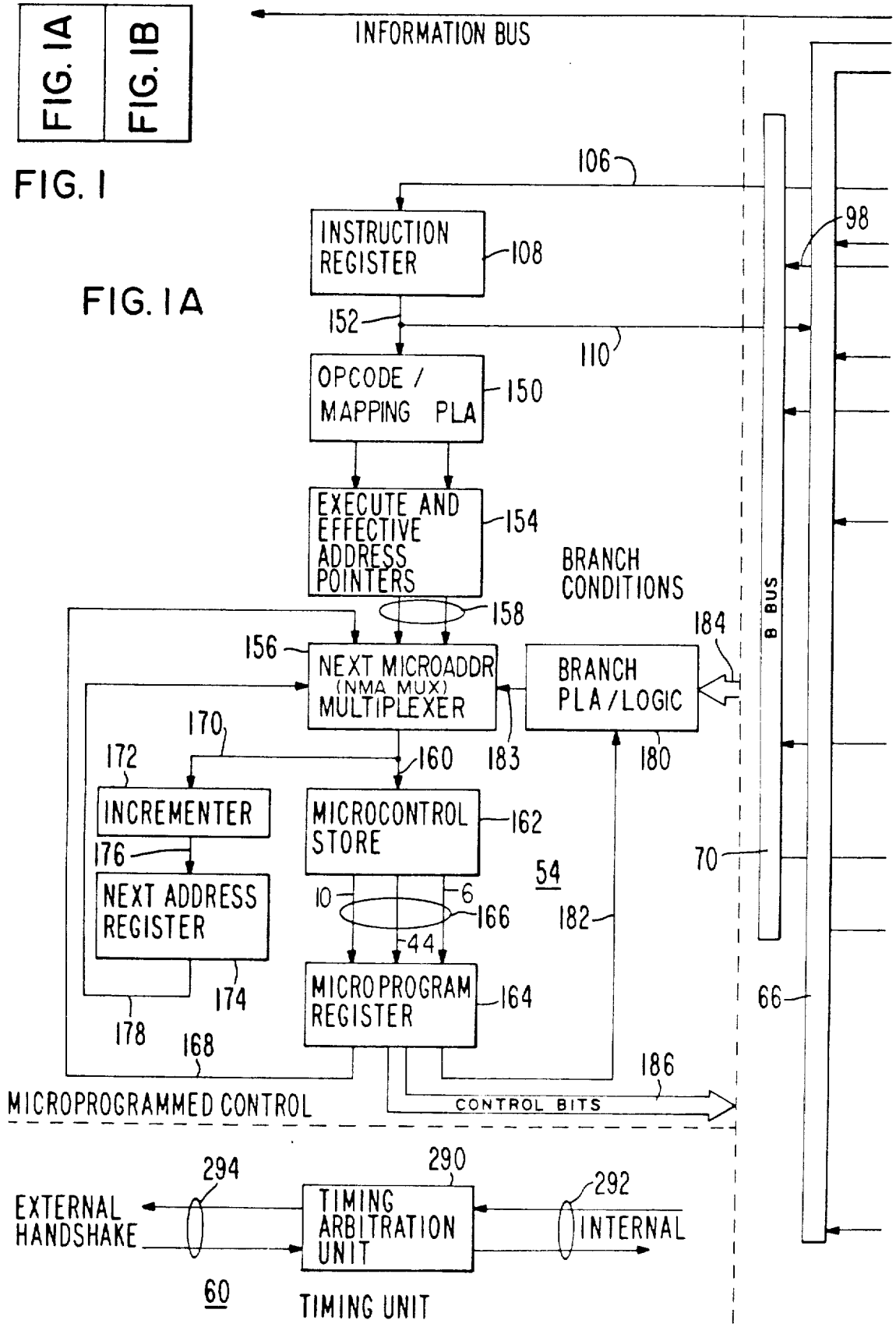

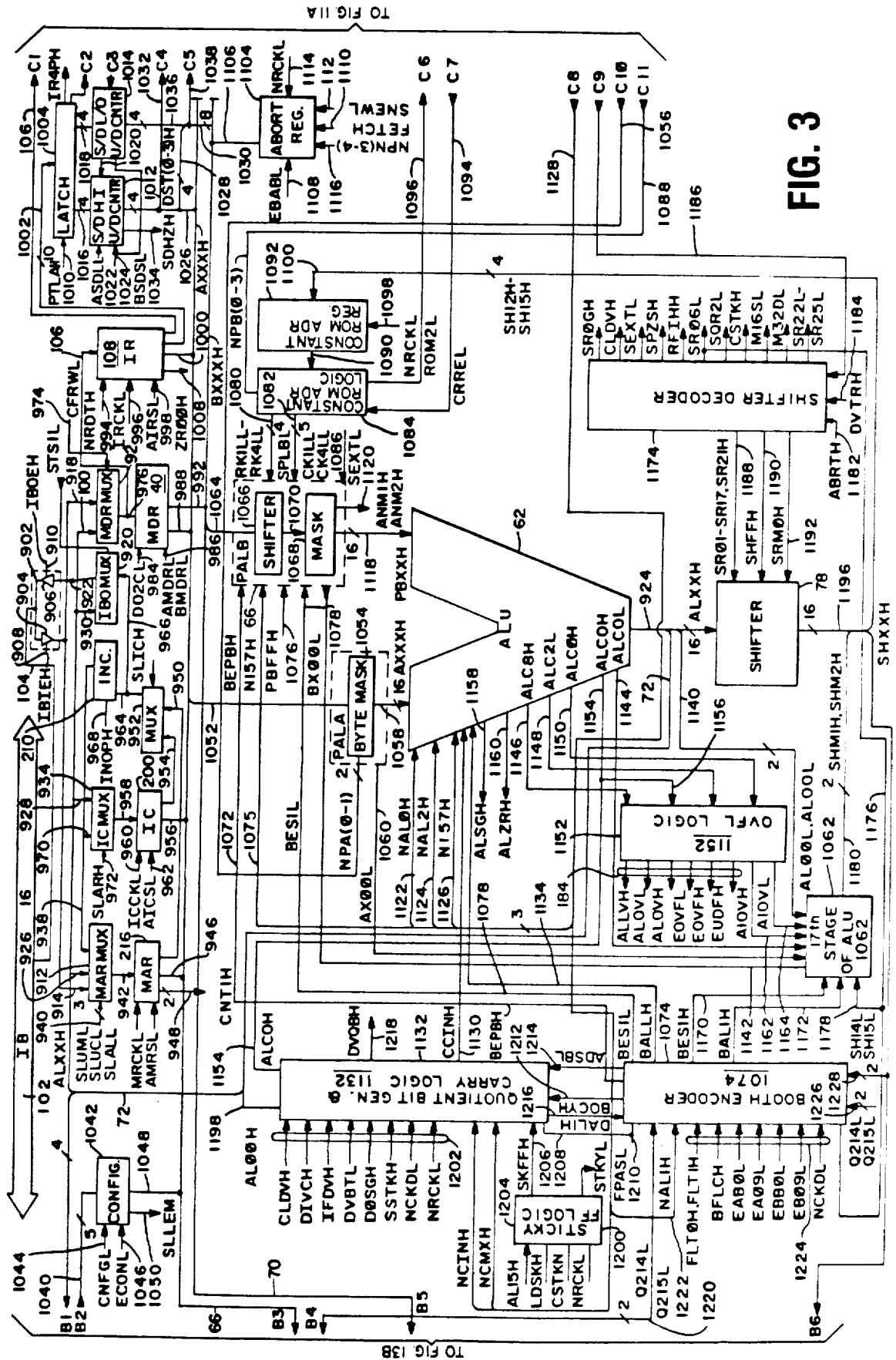

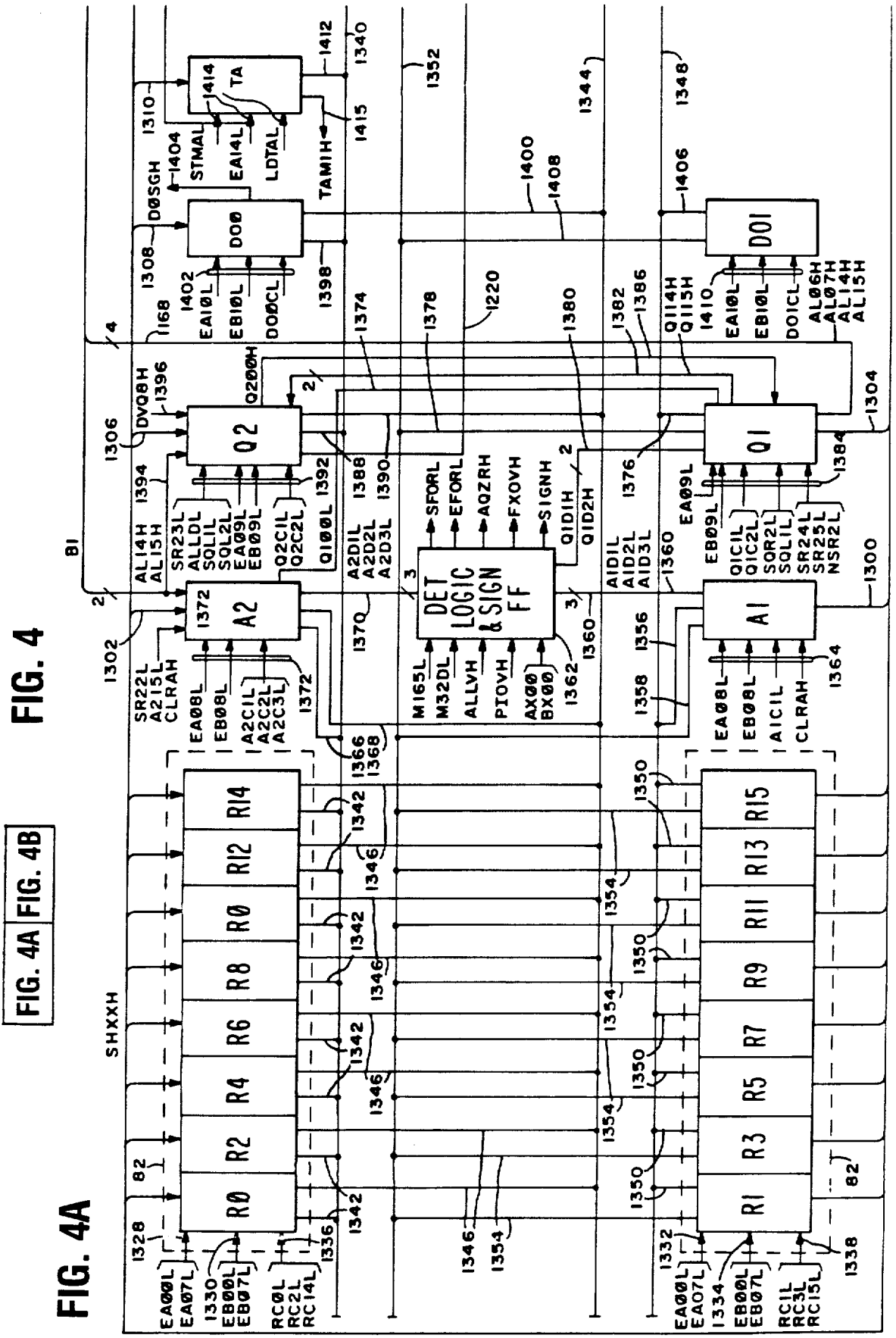

MICROPROCESSOR WITH COMPACT MAPPED PROGRAMMABLE LOGIC ARRAY

The U.S. Government has rights in this invention pursuant to contract number F33657-750-0310 awarded by the Department of the Air Force.

CROSS REFERENCE TO RELATED APPLICATIONS

This application is a continuation-in-part of: Nabil Damouny & Min-Siu Huang, "Microprocessor With Branch Control", Ser. No. 481,061, filed 3/31/83, now U.S. Pat. No. 4,573,118.

BACKGROUND OF THE INVENTION

This application relates to an improved architecture for a high performance microprocessor integrated circuit. More particularly, it relates to such a microprocessor system architecture which allows computed results to be fed back in real time to other parts of embedded computer systems. Most especially, this invention relates to such a microprocessor system architecture which allows the provision of a single chip very large scale integration (VLSI) 16-BIT bipolar microprocessor with floating point as well as fixed point arithmetic and extensive real time processing capabilities.

Commercially available microprocessor integrated circuits, such as an F9445 microprocessor integrated circuit, obtainable from Fairchild Camera & Instrument Corporation, Mountain View, Calif.; an Intel 8080, 8088, or 8087, obtainable from Intel Corporation, Santa Clara, Calif.; a Motorola 6800 or 68000, obtainable from Motorola, Inc., Phoenix, Ariz.; or a National Semiconductor 16000, obtainable from National Semiconductor Corporation, Santa Clara, Calif., all employ a series of elemental instructions called microcode for causing the microprocessors to carry out operations on data supplied to them. The microcode is typically stored in a read only memory (ROM), or a programmable logic array (PLA) structure forming a part of the microprocessor integrated circuit.

Since the first microprocessor was introduced, microprocessor integrated circuits have markedly increased both in the complexity and number of microinstructions that may be carried out, and in the number of circuit elements that can be incorporated in a single integrated circuit, with improvements in integrated circuit design and fabrication technology.

However, as the capabilities of microprocessors increase, users and potential users of microprocessors continually devise more sophisticated and demanding desired performance characteristics in a microprocessor. For example, embedded computer systems, such as automatic flight controllers, inertial navigation systems or industrial controllers require high precision computation done on rapidly changing "real life" variables. In such systems, the computed results have to be fed back in real time, i.e., within micro or milliseconds, to other parts of the systems to close the appropriate control loop. In particular, the instruction set architecture specified by MIL-STD-1750A (Notice 1) requires considerable improvement in microprocessor design for implementation. MIL-STD-1750A is of particular relevance for flight control systems, but similar demands are made by other real time processing environments, such as in data collection systems for nuclear physics experiments, radar data interpretation systems, rapid transit vehicle control, and even certain "on line" business applications. Such real time processing environments, for example, require high throughput and precision so that the results of data processing are available in time and in an accurate form to influence the process or system being monitored or controlled. In summary, such systems require a high performance microprocessor with both accurate floating point and fixed point arithmetic, and comprehensive interrupt and fault handling.

SUMMARY OF INVENTION

A microprocessor with a multiplexer having its output coupled to the input of the instruction register for storing instructions to be executed and applying the bits of the instruction as the input signals to a mapping PLA. The inputs of the multiplexer are the information bus coupled to external pins to receive instructions either from external memory or from an external console, and the output of the ALU. The path from the output of the ALU to the input of the instruction register allows better self testing of the processor by itself and self-generation of input/output instructions. This structure simplifies the processor by allowing console requests, instructions from memory and self generated instructions all to be stored in the same register, i.e., the instruction register, thereby eliminating the need for separate registers for each type of instruction. Further, this structure simplifies programming of repetitive I/O instructions for polling large numbers of I/O devices having sequential addresses in memory mapped I/O applications. That is, the microprocessor has the capability of generating its own I/O instructions from an operand coming in from memory such as by adding it to the contents of an index register and supplying the result to the instruction register through the ALU output, the ALU bus, and the multiplexer as the address of the particular I/O device to read from or write to. Whole series of I/O devices can be easily accessed sequentially in this manner by incrementing the index register or operand coming in from memory. Further, self test instructions coming in from memory can cause a thorough self test to occur because the ALU can generate its own series of instructions to exercise most of the capabilities of the microprocessor.

BRIEF DESCRIPTION OF THE DRAWINGS

FIG. 1 is a key showing placement of FIGS. 1A and 1B.

FIGS. 1A and 1B are a generalized block diagram of a microprocessor in accordance with the preferred embodiment.

FIG. 3 is a detailed block diagram illustrating instruction handling registers and circuitry for performing arithmentic operations of the microprocessor shown in FIGS. 1A and 1B.

FIG. 4 is a key showing placement of FIGS. 4A and 4B.

FIGS. 4A and 4B are a detailed block diagram illustrating register storage and interrupt handling circuitry of the microprocessor shown in FIGS. 1A and 1B.

DETAILED DESCRIPTION OF THE INVENTION

In the following description, numerous specific details are set forth such as specific register and bus sizes, etc. to provide a thorough understanding of the present invention. However, it will be obvious to those skilled in the art that the present invention may be practiced without such specifc details. In other instances, well-known circuits have been shown in block diagram in order not to obscure the present invention in unnecessary detail. Generally, control and clocking signals are set forth as mnemonics with the last letter of the mnemonic being an "H" or an "L" signifying active high and active low respectively.

Figure 1B:
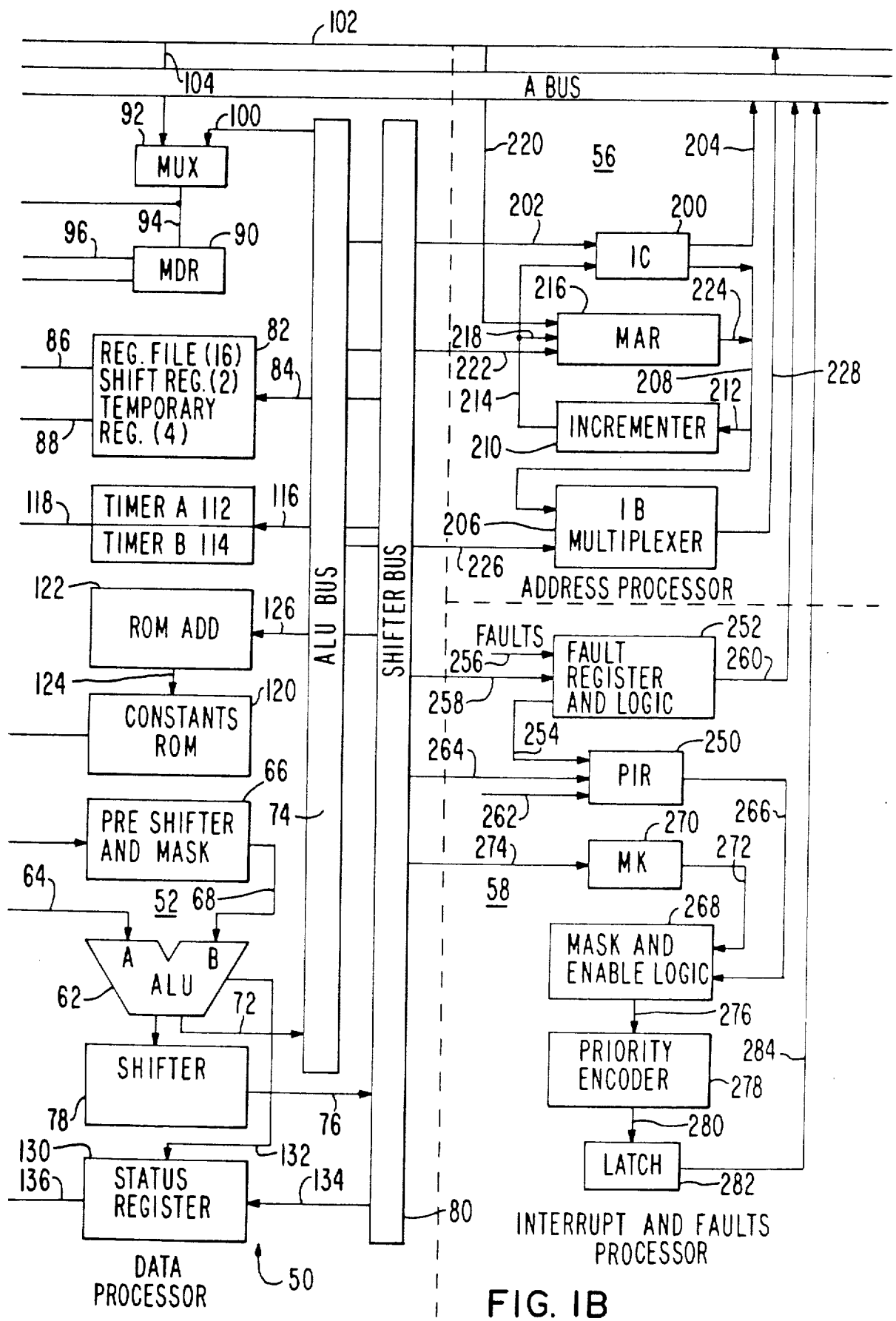

Turning now to the drawings, more particularly to FIGS. 1A and 1B, there is shown a block diagram of a microprocessor 50 in accordance with the invention. The microprocessor 50 consists of five main sections: A data processor 52, a microprogrammed control 54, an address processor 56, an interrupt and fault processor 58, and a timing unit 60.

The detail block diagram of data processor 52 (FIGS. 12, 13A and 13B) the microprogrammed control 54 (FIG. 11A, 11B and 18) show the various logic circuits comprising such sections of the invention as boxes having input lines and output lines. The address processor 56 is conventional and is sufficiently illustrated by the block diagram of FIG. 1B.

Figures 2, 2A:
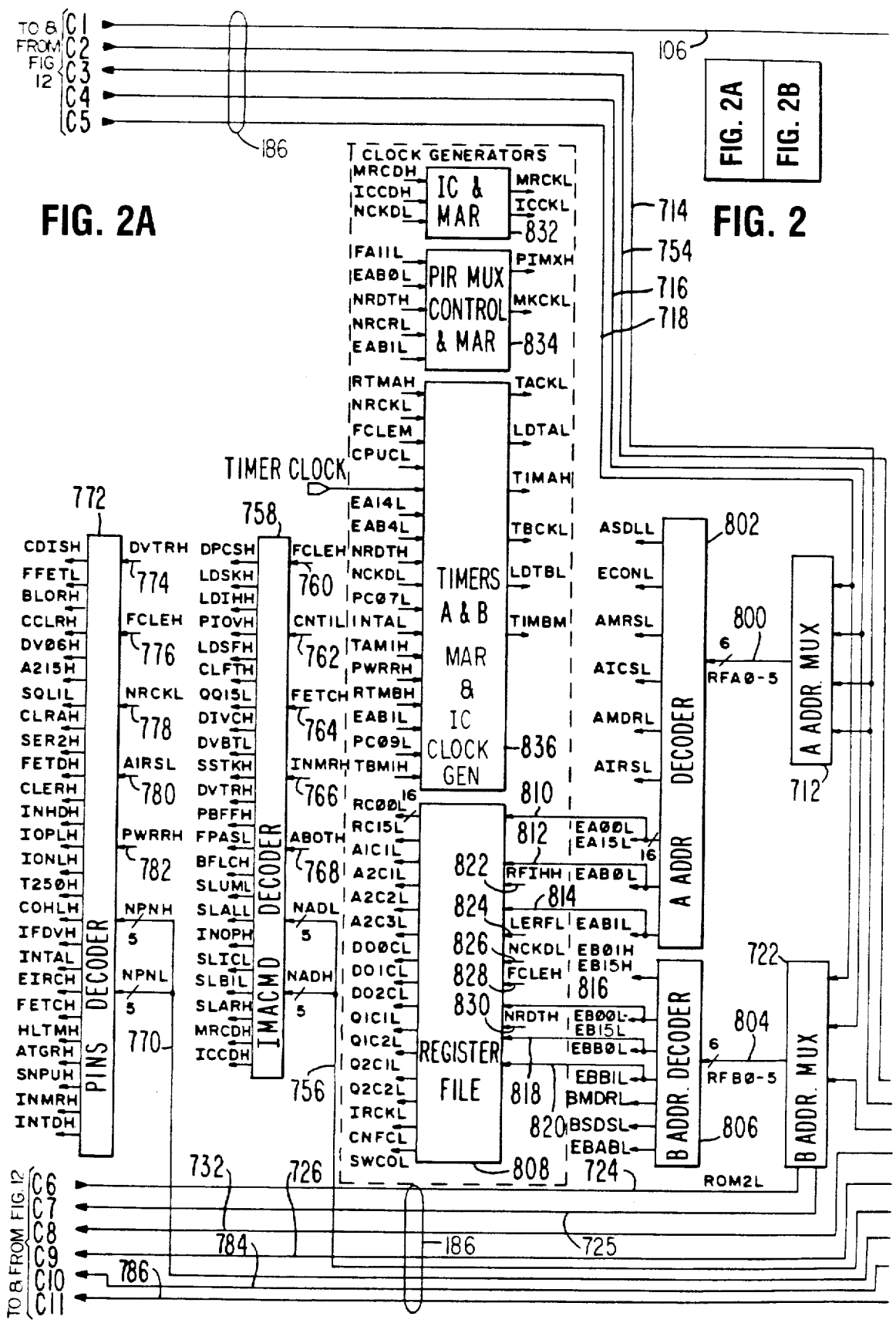
FIG. 2 is a key showing placement of FIGS. 2A and 2B.
FIGS. 2A and 2B is a detailed block diagram illustrating the control section of the microprocessor shown in FIGS. 1A and 1B.
Figure 2B:
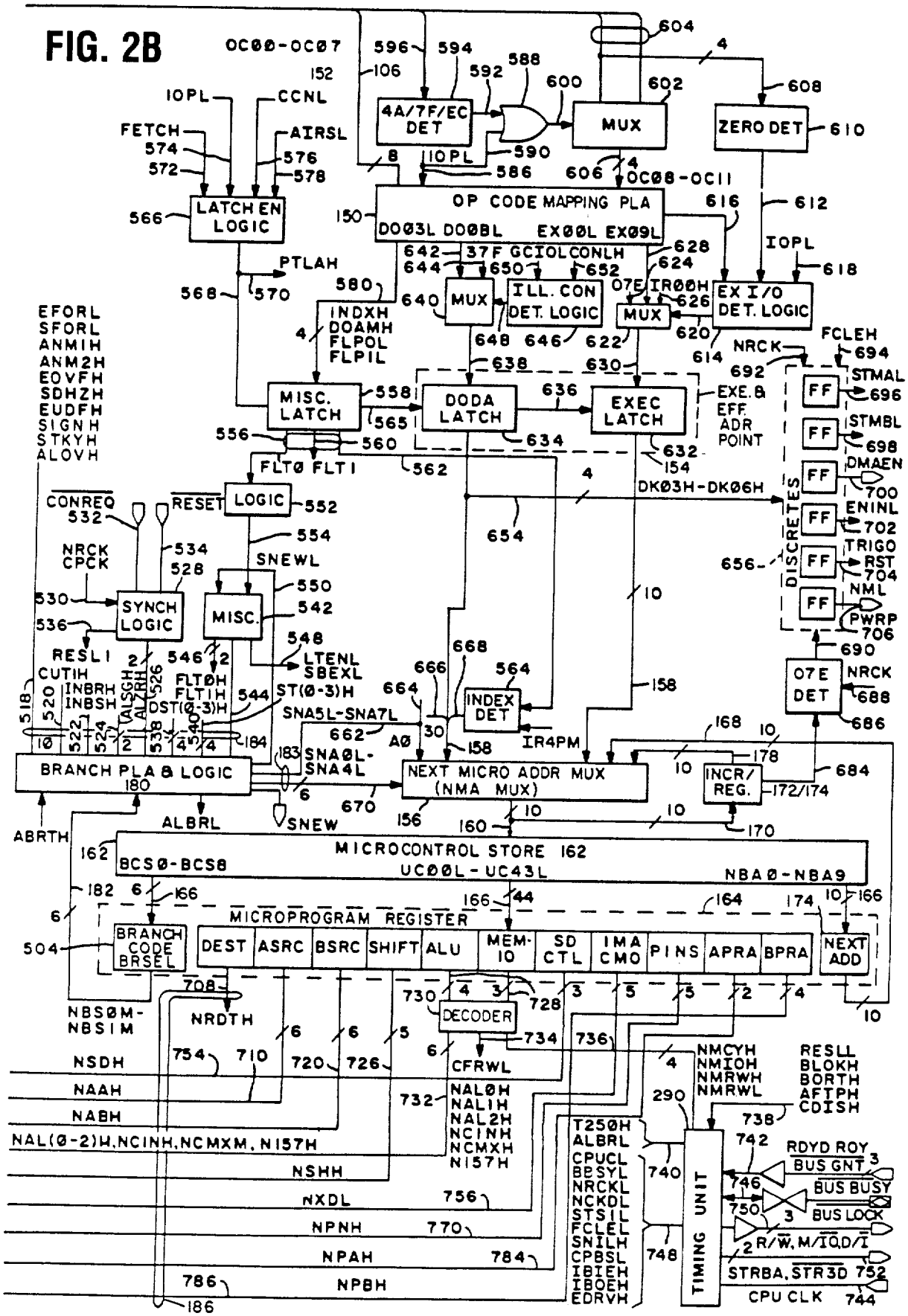

To aid in an understanding of the operation of microprogrammed control section 54, the structure of which is set forth below, reference is made to Appendices A, B and C to the disclosure. Appendix A comprises a list of the macroinstructions which are implemented, in microcode, in the invented microprocessor. Set forth for each instruction are its mnemonic, addressing mode or modes (e.g. relative, direct, immediate, etc.) and function (e.g. branch, add, AND, shift, etc.). Appendix B sets forth the truth-table for the Op Code/Mapping PLA 150 in FIG. 1A for each macro-level instruction as follows: (i) its mnemonic; and, (ii) in binary, its input vector, i.e, the status of the input signals for each machine state in columns 1-14 to the right of the mnemonic; (iii) its output signals for each machine state in the remaining columns 15-37 to the right of the mnemonic, and (iv) its address in microcontrol store 162. A microcode assembly listing of the contents of microcode control store 162 is set forth in Appendix C. In Appendix C the definitions and the meanings of the codes in the various fields of the microcode control words that are output from the microcode control store are defined in the first pages of the listing. The fields of the control words are shown in FIG. 2B as blocks in the microprogram register 164. The actual microcode control words are shown in Appendix C to the left of the the line numbers starting at approximately line 700. The control words are listed in hex notation, but conversion to binary will give the binary state of every signal leaving the microprogram regiter to control the various logic elements in the microprocessor and the sequence and timing of every such signal during all operations of the microprocessor. Appendix E is a truth table for the branch PLA 180 in FIG. 1A showing input signal conditions for each internal state of the machine and output signal states for each state.

The 16 bit data processor section 50 is responsible for all data processing in the microprocessor 50. The data processor 52 includes the functional blocks discussed below. A 17 bit arithmetic logic unit (ALU) 62 receives inputs at 64 from an A input bus 66, and at 68, through a preshifter and mask 66, from B input bus 70. Outputs from the ALU 62 are supplied at 72 to an ALU bus 74, and at 76, through shifter and mask 78, to a shifter bus 80. Register file 82 contains 16 general purpose registers $R_0-R_{15}$ and six working registers. The register file 82 receives inputs from ALU bus 74 at 84 and provides inputs to the A input bus 66 and the B input bus 70 at 86 and 88, respectively. A memory data register 90 receives inputs from multiplexer 92 at 94 and supplies inputs to the A input bus 66 and the B input bus 70 at 96 and 98, respectively. The multiplexer 92 receives inputs from the ALU bus 74 at 100 and from the information bus 102 at 104. The multiplexer 92 also supplies inputs at 106 to instruction register 108 in the microprogrammed control section 54. The instruction register 108 provides inputs at 110 to the A input bus 66. Two timers 112 and 114 receive inputs from shifter bus 80 at 116 and provide inputs at 118 to the A input bus 66. A constants read only memory (ROM) 120 receives ROM addresses from ROM address register 122 at 124. The ROM address register 122 receives inputs from the shifter bus at 126. A status register 130 receives inputs from the ALU 62 at 132 and from the shifter bus 80 at 134. The status register 130 provides inputs to A input bus 66 at 136.

The instruction register 108 in microprogrammed control section 54 provides new instructions fetched into the instruction register 108 to the Mapping PLA 150 at 152. The mapping PLA 150 generates the pointers necessary for both the execution and the effective address calculation routines. These pointers are stored in a latch indicated at 154, and are supplied to a next microaddress multiplexer (NMA MUX) 156 on the bus lines 158. The multiplexer 156 provides an address at 160 selected from one of several input ports to the microcontrol store 162. The microcontrol store is a ROM which stores software defining the execution and the effective address calculation routines for each of the instructions in the instruction set shown in Appendix B. The microcontrol store 162 outputs sequences of control words having numerous fields to the microprogram register 164 on the bus 166. The bus 166 is made up of three separate buses: a 10 bit next address field; a 44 bit collection of fields for controlling various funtions in the microprocessor; and a 6 bit branch select code. The next address field supplied to microprogram register 164 is supplied at 168 to multiplexer 156 allow the microcode to specify its own next address for jumps to subroutines etc. in the microcode. The input field selected by the NMA MUX 156 is controlled by the branch PLA/logic 180 by the output signals from the branch PLA on the bus 183 which is coupled to the control inputs of the NMA MUX 183. The input signals that control the internal state of the branch PLA arrive on the bus 182 as the branch select field and on the bus 184 representing various internal and external branch conditions such as overflow, interrupt, abort etc.

The multiplexer 156 also supplies the current microcode address on the bus 170 to incrementer 172. The incrementer 172 provides increments the microcode address to the next microcode address and outputs the result to the next address register 174 at 176. The next address register 174 stores the next microcode address providing the NMA MUX does not select another field as the next microcode address. The contents of the next address register 174 are provided as an input field at 178 to the multiplexer 156.

The third 44 bit output field from microcontrol store 162 is supplied through the microprogram register 164 as a control bus comprised of the many fields defined in Appendix D which control operation of all the components in the microprocessor as the control bits 186.

The address processor section 56 includes an instruction counter (IC) 200, which receives inputs from the ALU bus 74 at 202. The IC 200 supplies instruction addresses to the A input bus 66 at 204. The IC 200 also supplies the instruction addresses to the information bus multiplexer 206 at 208, and to the incrementer 210 at 212. The incrementer increments the instruction address and provides the output Outputs from the incrementer 210 are supplied to the information bus 102 at 220 and the ALU bus 74 at 222. The MAR 216 determines the addresses for all operands and supplies the address outputs at 224 to the incrementer 210 and the information bus multiplexer 206. An additional input to the information bus multiplexer 206 is supplied by the ALU bus 74 at 226. The output of the information bus multiplexer 206 is supplied to the information bus 102 at 228. The incrementer 210 provides IC and operand address updated paralleling operation of the data processor section 52.

The interrupt and faults processor section 58 handles all interrupts and faults, whether generated internally or externally of the microprocessor 50. The interrupts and fault processor 58 has a pending interrupt register (PIR) 250. A fault register and logic (FT) 252 provides inputs to the PIR 250 at 254. Fault inputs are supplied to the FT 252 at 256, and from the shifter bus 80 at 258. Outputs from the FT 252 are also supplied to the A input bus 66 at 260. Additional interrupt inputs to the PIR 250 are supplied at 262, and from the shifter bus 80 at 264. Outputs from the PIR 250 are supplied at 266 to mask and interrupt enable logic 268. A mask register (MK) 270 provides inputs at 272 to mask and interrupt enabling logic 268. Inputs to the MK 270 are provided from shifter bus 80 at 274. The mask and interrupt enabling logic 268 provides outputs at 276 to a priority encoder 278. The priority encoder 278 provides outputs at 280 to a latch 282. The latch 282 provides outputs at 284 to the A input bus 66.

The timing unit 60 generates internal and external strobes required for internal operation of the microprocessor 50 and different bus transactions. Internal inputs are provided to and from a timing arbitration unit 290 at 292. Inputs external of the microprocessor 50 are provided to and from the timing arbitration 290 at 294.

FIGS. 2A and 2B, 3, and 4A and 4B are more detailed block diagrams of the microprocessor shown in FIGS. 1A and 1B. Microcontrol store ROM 162 (FIG. 2B) is connected by lines 166 to branch code register 504, to micro program register 164 by lines 508, and by lines 510 to next address register 174. The output of branch code register 505 is connected by lines 182 to branch PLA and logic 180. Ten signals indicating various internal branch conditions are supplied on lines 518 to the branch PLA and logic 180. The CUT 1H signal is applied to the branch PLA and logic on line 520. The INBRH and INBSH signals are supplied to PLA and logic 180 on lines 522. The ALSGH and ALZRH signals are supplied to PLA and logic 180 on lines 524. The PWRRH and CORQH signals are supplied to PLA and logic 180 on line 526 from synchronization logic 528.

The NRCK and CPCK clock signals are supplied to synchronization logic 528 on line 530. The CONREQ and RESET signals, respectively, are supplied to the synchronization logic 528 on lines 532 and 534. The synchronization logic 528 also produces the RESL1 signal on line 536. The DST0H through DST3H signals are supplied to PLA and logic 180 on lines 538. The ST0H through ST3H signals are supplied to the PLA and logic 180 on lines 540. An output of miscellaneous circuit 542 is connected to the PLA and logic 180 by line 544. The miscellaneous circuit 542 also provides the FLT0H and FLT1H signals on lines 546 and the LTENL and SBEXL signals on lines 548. One input to the miscellaneous circuit 542 is provided by the PLA and logic 180 on line 550 as the SNEWL signal. The second input to miscellaneous circuit 542 is provided by logic circuit 552 on line 554. The input to logic circuit 552 is provided on line 556 by miscellaneous latch 558 as the FLT0 signal. Another output from the miscellaneous latch 558 is the FLT1 signal on line 560. The remaining output from miscellaneous latch 558 on line 562 is supplied to index detector 564. One input to miscellaneous latch 558 is provided by latch enable logic 566 as the PTLAH signal on line 568. The PTLAH signal is also supplied on line 570. The inputs to latch enable logic 566 are the fetch, IOPL, CCNL and AIRSL signals on lines 572, 574, 576, and 578, respectively. Another output from the miscellaneous latch circuit 558 is supplied on line 565 to the DODA latch. The remaining inputs to miscellaneous latch 558 are the INDXH, DOAMH, FLPOL and FLPIL signals on lines 580, supplied by opcode PLA 582. OC00 through OC07 input signals to the op code mapping PLA 150 are supplied on lines 106. The IOPL signal is supplied to opcode PLA 150 on line 586, and also as one input to OR gate 588 on line 590. The other input to OR gate 588 is upplied on line 592 by 4A/7F/EC detector circuit 594. The 4A/7F/EC detect circuit 594 is connected by lines 596 and 598 to C1. Lines 106 are also connected by lines C1 to the instruction register 108 in FIG. 12. The output of OR fate 588 on line 600 forms one input to multiplexer 602. Additional inputs to multiplexer 602 are supplied from C1 by lines 598 and 604. The output of multiplexer 602 is the OC08-)C11 signals on lines 606, supplied as the remaining inputs to opcode PLA 150. Inputs from C1 through lines 598 and 604 are connected by lines 608 to zero detection circuit 610. The output of zero detection circuit 610 is connected by lines 612 to external I/O detection logic 614. The other inputs to external I/O detection logic 614 are the GCIOL sisgnal on line 616 from opcode PLA 150 and the IOPL signal on line 618. The output of detection logic 614 is supplied as one input to multiplexer 622. The 07E and IR00H signals on lines 624 and 626 form additional inputs to the multiplexer 622. The remaining inputs to multiplexer 622 are the EX00L through EX09L signals supplied by opcode PLA on lines 628. The output of multiplexer 622 on lines 630 is one input to execution latch 632. A second input to execution latch 632 is provided by DODA latch 634 on line 636. One input to DODA latch 634 is provided by the miscellaneous latch 558 on line 565. The DODA latch 634 and the execution latch 632 together comprise the execute and eeffective address pointers latch 154 in FIG. 1A. The other input to DODA latch 634 is provided on lines 638 by multiplexer 640. The opcode PLA 150 supplies the DO03L through DO08L signals as an input to multiplexer 640 on lines 642. The 37F signal is provided as an additional input to multiplexer 640 on line 644. The remaining input to multiplexer 640 is supplied by the illegal condition detection logic 646 on line 648. The GCIOL and CONLH signals are supplied on lines 650 and 652, respectively, as inputs to the illegal condition detection logic 646. The DKO3H through DKO6H signals are also supplied as inputs on lines 158 to the next microaddress multiplexer 156. Additional input to the next microaddress multiplexer are the SNA5L through SNA7L signals on lines 662 from PLA and logic 516, the A0 signal on line 664, the 30 signal on line 666, the output of index detector 564 on line 668, and the SNA0L through SNA4L signals from PLA and logic 180 on lines 670. Additional inputs to the next microaddress multiplexer 156 are supplied by the output of execution latch 632 on lines 158, the output of next address register 512 on lines 168, and the output of increment register 172/174 on lines 178. The output of next microaddress multiplexer 156 is suppied on line 160 as the input to microcontrol store ROM 162, on lines 170 as the inputs to increment register 174 and on line 684 as an input to 07E detector 686. The other input to 07E detector 686 is the NRCK clock signal on line 688. The output of 07E detector 686 is supplied on line 690 as an input to discretes flipflops 656. The remaining inputs to the discretes flipflops 656 are the NRCK clock signal on line 692 and the FCLEH signal on line 694. The output of discretes flipflops 656 are the STMAL, STMBL, DMA EN, ENINL, TRIGO RST and NMLPWRP signals, respectively, on lines 696, 698, 700, 702, 704 and 706.

The NRDTH signal is provided on line 708 as an output from microprogram register 164. The NAAH signal is provided on lines 710 as an input to A address multiplexer 712. Additional inputs to the A address multiplexer 712 are supplied through C2, C4 and C5 on lines 714, 716 and 718. The NABH signal is supplied by nano control register 506 on lines 720 as an input to the B address multiplexer 722. Additional inputs to the B address multiplexer are supplied through C4 and C5 on lines 716 and 718, and by the ROM 2L signal on line 724 through C6. The NSHH output signal from microprogram register 164 is supplied on line 726 through C9. Outputs from the microprogram register 164 are supplied on lines 728 to decoder 730. The NAL0H through NAL2H, NCINH, NCMXH and N157H signals are supplied as outputs from the decoder 730 on lines 732 through C8. The CFRWL signal is supplied by decoder 730 on line 734. The NMCYH, NMIOH, NMRWH and NMRWL signals are supplied by decoder 730 on lines 736 as inputs to timing arbitration unit 290 (see also FIG. 1A). Additional input to the timing unit 290 are the RESLL, BLOKH, BORTH, AFTPH and CDISH signals on lines 738, the T25OH and ALBRL signals on lines 740, the RDYD, RDYA and BUS GNT signals on lines 742, the CPU CLK signal on line 744, and the bi-directional BUS BUSY and BUS LOCK signals on lines 746. The outputs of timing unit 290 are the CPUCL, BBSYL, NRCKL, NCKDL, STSIL, FCLEL, SNLH, CPBSL, 1B1EH and EDRVH signals on lines 748, the R/W, M/IO and D/I signals on lines 750, the STRBA and STRBD signals on lines 752 and the output BUS BUSY and BUS LOCK signals on lines 746.

The NSDH output signal is supplied by microprogram register 164 on lines 754 through C3. The NADL and NADH output signals from microprogram register 164 are supplied on lines 756 to IMACMD decoder 758. Additional input to the IMACMD decoder are the FCLEH, CNTIL, FETCH, INMRH, ABOTH, signals on lines 760, 762, 764, 766 and 768, respectively. The MPNH and MPNL output signals from microprogram register 164 are supplied on lines 770 as input to he pins decoder 772. The other inputs to the pins decoder 772 are the DVTRH, FCLEH, NRCKL, AIRSL, PWRRH signals on lines 774, 776, 778, 780 and 782, respectively.

The NPAH output signals from microprogram register 164 are supplied on lines 784 through C10. The NPBH output signals on lines 786 through C11 are the remaining outputs from microprogram register 164.

The outputs from A address multiplexer 712 are the RFA0 through RFA5 signals, supplied on lines 800 to A address decoder 802. The outputs from B address multiplexer 722 are the RFB0 through RFB5 signals, supplied on line 804 to B address decoder 806. The outputs of the A and B address decoders 802 and 806 are shown to the left of those units. The EA00L through EA15L, EAB0L and EAB1L signals are supplied by the A address decoder 802 to register file 808 on lines 810, 812 and 814, respectively. The EB00L-EB15L, EBB0L and EBB1L signals are supplied by the B address decoder 806 on lines 816, 818 and 820 as inputs to the register file 808. The other inputs to register file 808 are the RFIHH, LERFL, NCKDL, FCLEH and NRDTH signals on lines 822, 824, 826, 828 and 830, respectively. The outputs of register file 808 are shown to the left of that unit. The outputs of the IMACMD decoder 758 and the pins decoder 772 are also shown to the left of each of those units. The inputs and outputs to the instruction and memory address register lcock generator 832, the PIr multiplexer control and mask register clock generator 834 and A and B timers, MAR and IC clock generator 836 are shown respectively to the left and right of each of those units.

Turning to FIG. 3, information bus 102 is connected by lines 900 and 902 to input and output amplifiers 904 and 906. Additional inputs to the amplifiers 904 and 906 are supplied by the IBIEH and IBOEH signals on lines 908 and 910, respectively. Input amplifier 904 is connected to memory address register multiplexer 912 by lines 914 and to memory data register 90 and multiplexer 916 by lines 918. Information bus output multiplexer 920 is connected to output amplifier 906 by lines 922. The output of ALU 62 is connected by lines 924, 926, 928, 930 and 932 to the memory address register multiplexer 912, the instruction counter multiplexer 934, the information bus output multiplexer 920 and the mrmory data register multiplexer 916, respectively. Incrementer 936 provides an input to memory address register multiplexer 912 on line 938. The SLUML, SLUCL and SLALL signals provide additional inputs to the multiplexer 912 on line 940. The output of multiplexer 912 is supplied on lines 942 to memory address register 216. The memory address register 216 is connected to bus 944 by lines 946. The memory address register 216 provides the CUTIH and CNTIH signals on lines 948. The memory address register 216 is connected by lines 950 to multiplexer 952. Multiplexer 952 also receives inputs from instruction counter 200 on lines 954. Instruction counter 200 is connected to bus 944 by lines 956, and to the instruction counter multiplexer 934 by lines 958. Additional inputs to the instruction counter 200 are provided by the ICCKL and AICSL signals on line 960 and 962. The output of multiplexer 952 is supplied to incrementer 210 on line 964, and to multiplexer 920 on line 966. An additional input to the incrementer 210 is provided by the INOPH signal on line 968. The output of incrementer 210 is supplied to instruction counter multiplexer 934 on line 970. An additional input to the instruction counter multiplexer 934 is supplied by the SLARH signal on line 972.

The memory data register multiplexer 916 receives the CFRWL signal on line 974. The memory data register multiplexer 916 supplies its output on lines 976 to the memory data register 978, and to the instruction register 180 on lines 982. Additional inputs to the memory data register 978 are provided by the DO2CL, AMDRL and BMDRL signals on lines 984 and 986. The memory data register 978 is connected to bus 944 by lines 988, and to bus 990 by lines 992.

Additional inputs to the instruction register 108 are supplied by the NRDTH, IRCKL and AIRSL signals on lines 994, 996 and 998. The instruction register 108 is connected to bus 944 by lines 1000. Outputs from the instruction register 108 are supplied on lines 1002 to latch 1004. Outputs from the instruction register 108 are also provided on lines 106 through C1. The instruction register 108 also provides the ZR00H signal on line 1008.

Latch 1004 receives the PTLAH signal on line 1010. Latch 1004 provides outputs to the S/D HI U/D counter 1012 and the S/D LO U/D counter 1014 on lines 1016 and 1018, respectively. The counter 1014 supplies an input to he counbter 1012 on line 1020. additional inputs to the counter 1012 are the ASDLL signal on line 1022 and the BSDSL on line 1024. The counter 1012 is connected to bus 944 by lines 1026, to bus 990 by lines 1028 and 1030, and by lines 1032 through C4 (see also FIG. 11A). The counter 1012 also provides the SDHZH signal on line 1034. Counter 1014 is connected to bus 990 by lines 1036 and 1030. Lines 1028 also connect counter 1014 to bus 944. The outputs of both counters 1012 and 1014 and bus 990 are supplied on lines 1038 through C5 (see also FIG. 11A).

The SH00H through SH04H signals are supplied through B2 on lines 1040 to configuration register 1042. Additional inputs to the configuration register 1042 are the CNFGL and ECONL signals on lines 1044 and 1046. Configuration register 1042 is connected by lines 1048 and to bus 944. The SLEEH signal is also supplied by configuration register 1042 on line 1050.

Bus 944 is connected by bus 1052 to byte mask 1054. The other inputs to byte mask 1054 are the NPA0 and NPA1 signals supplied on lines 1056 through C10. The AXXXH signals are supplied by byte mask 1054 on line 1058 as the A input to ALU 62. The AXOOL signal is supplied on line 1060 as one input to 17th stage of ALU1062. The BXXXH signals are suppled on bus 1064 to shifter 1066. The output of shifter 1066 is suppied to mask 1068 on lines 1070. Additional inputs to the shifter 1066 and mask 1068 are supplied by the BEPBH signal on line 1072 from booth encoder 1074, the N157H signal supplied on line 1075 through C8, the PBFFH signal, supplied on line 1076 and the BESIL signal, supplied on line 1078 from the booth encoder 1074. Additional inputs to the shifter 1066 and mask 1068 are suppiled by the RK1LL through RK4LL signals on lines 1080, the SPLBL and CK1LL through CK4LL signals on lines 1082, all of these signals being provided by Constant ROM address logic 1084. The SEXTL signal is also supplied by shifter 1066 and mask 1068 on line 1086.

Inputs to the Constant ROM address logic 1084 are provided by NPB0 through NPB3 signals supplied on line 1088 through C11, on lines 1090 from ROM address register 1092, and by the CRREL signal on line 1094 through C7. The Constant ROM address logic 1084 also rpovides the ROM2L signal on line 1096 through C6.

The inputs to ROM address register 1092 are the NRCKL clock signal on ine 1098 and the SH12H through SH15H signals on lines 1100 from shifter 78.

Abort register 1104 is connected to bus 990 by lines 1106. The inputs to abort register 1104 are the EBABL, FETCH, SNEWL, NRCKL signals on lines 1108, 1110, 1112, 1114 and the NPN3 and NPN4 signals on lines 1116.

Mask 1068 provides the PBXXH signals on lines 1118 as the B input to ALU 62. Mask 1068 also rpovides the ANM1H and ANM2H signals on lines 1120. Additional input to the ALU 62 are the NAL0H, NAL2H and N157H signals, supplied on lines 1122, 1124 and 1126, respectively, through C8 and line 1128. The CCINH signal is supplied on line 1130 to ALU 62 by quotient bit generator and carry logic 1132. The BALLH signal is supplied by booth encoder 1074 on line 1134 to ALU 62.

The ALXXH output signals are supplied by ALU 62 on lines 924 to shifter 78. AL00L and AL0OL signals are supplied by ALU 62 on lines 1140 to ALu 17th stage 1062. The BX00L signal is supplied on line 1142 to ALU 17th stage 1062 from shifter and mask 1066 and 1068. The ALCOL signal is supplied to ALU 17th stage 1062 by ALU 62 on line 1144. The ALC8H, ALC2L and ALCOH signals are supplied by ALU 62 on lines 1146, 1148 and 1150 to overlfow logic 1152. The ALCOH signal is supplied to overflow logic 1152 by ALU 62 on lines 1154 and 1156, and to quotient bit generator and carry logic 1132 on line 1154. The ALU 62 also provides the ALSGH and ALZRH signals on lines 1158 and 1160.

Overflow logic 1152 provides the AlOVH and AlOV1 signals on lines 1162 and 1164 to ALU 17th stage 1062. Overflow logic 1152 also provides the ALLVH, ALOVL, ALOVH, EOVFL, EOVFH and EUDFH signals on lines 184 to the branch PLA 180 in FIG. 1A.

Outputs from the ALU 62 are also provided on lines 1168, from lines 924 and 926, through B1.

Additional inputs to the ALU 17th stage 1062 are the BES1H and BAL1H signals supplied by booth encoder 1074 on lines 1170 and 1172. The SR06L signal is also supplied to the ALU 17th stage 1062 from shifter decoder 1174, on lines 1176 and 1178. The SR06L sisgnal is also supplied to booth encoder 1074 on line 1176. ALU 17th stage 1062 supplies the SHM1H and SHM2H signals on lines 1180. Shifter decoder 1174 receives the ABRTH and DVTRH input signals on lines 1182 and 1184, and an input on 1186 through C9 (see also FIGS. 11A and 11B). The shifter decoder 1174 supplies the SR01 through SR17, SR21H, SHFFH and SRM0H signals to shifter 78 on lines 1188, 1190 and 1192. Additional signal outputs from the shifter decoder 1174 are shown to the right of that unit.

The SHXXH signals are supplied by shifter 78 on lines 1196. Lines 1196 are connected through B6 to register file 82.

The AL00H signal is provided by line 926 and line 1198 from ALU 62 to quotient bit generator and carry logic 1132. The NCINH and NCMHX signals are supplied to generator and logic 1132 by lines 1200 and 1128 through C8. The CLDV, DIVCH, IFDVH, DVBTL, DOSGH, SSTKH, NCKDL, NRCKL signals are supplied to generator and logic 1132 on lines 1202. The SKFFH signal is supplied to quotient bit generator and carry logic 1132 from sticky flip-flop logic 1204 on line 1206. The FPASL signal is supplied to the generator and logic 1132 on line 1208 and to booth encoder 1074 on line 1210. The BOCYH and ADSBL signals are supplied by the booth encoder 1074 to the generator and logic 1132 on lines 1212 and 1214. The generator and carry logic 1132 provides the DAL1H signal to booth encoder 1074 on line 1216. The generator and logic 1132 provides the DVQBH signal on line 1218.

The Q214L and Q215L signals are supplied to the booth encoder 1074 on lines 1220 through B4 (see also FIGS. 13A and 13B). The NAL1H signal is provided to booth encoder 1074 from lines 1200 on line 1222. The FLT0H, FLT1H, BFLCH, EABOL, EA09L, EFF0L, EB09L AND NCKDL signals are supplied to the booth encoder 1074 on lines 1224. The Q214L and Q215L signals are supplied to booth encoder 1074 on lines 1226. The SH14L and SH15L signals are supplied to booth encoder 1074 on lines 1228.

Figure 4B:
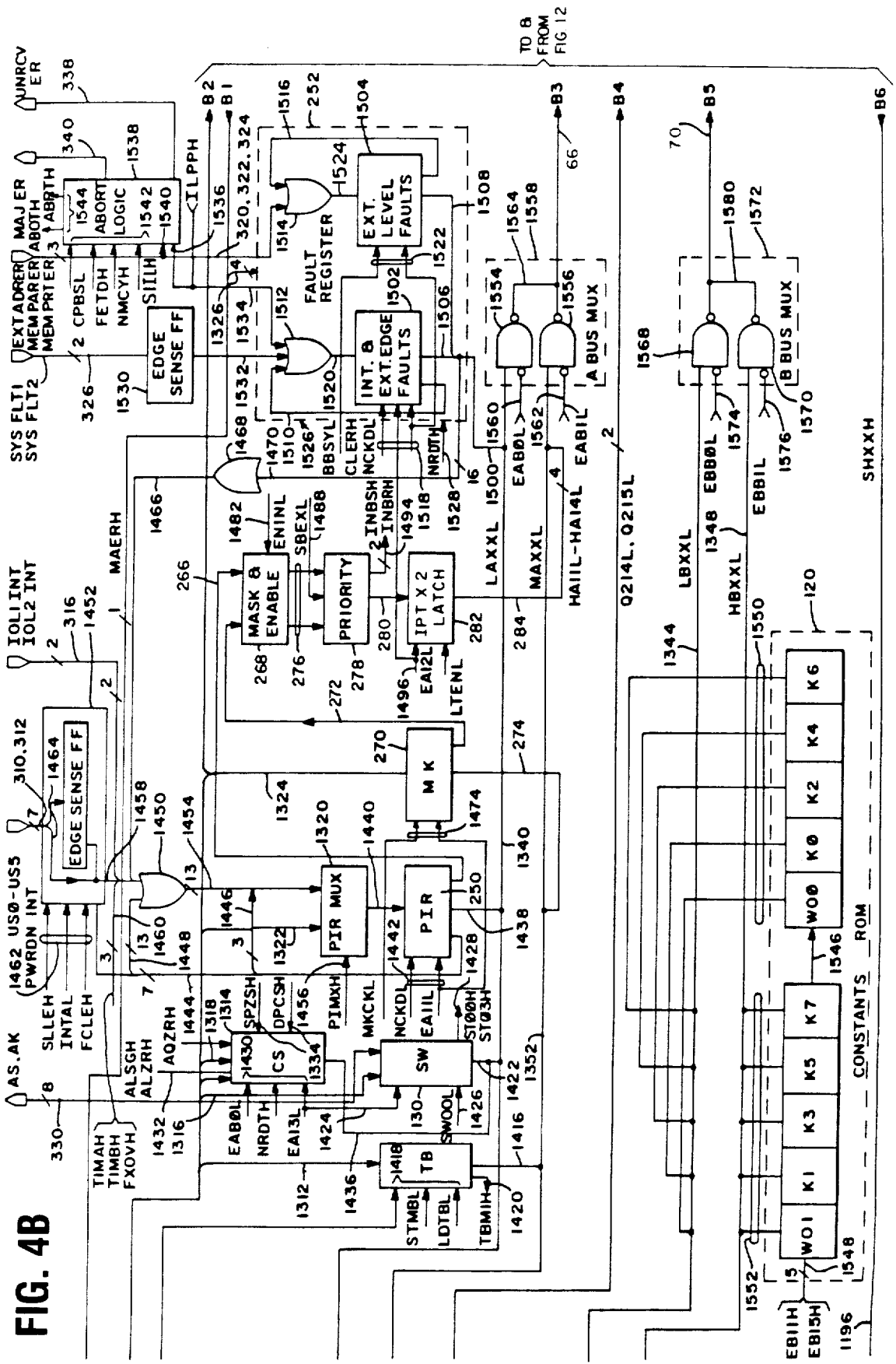

Details of the register file 82 and associated circuits are shown in FIGS. 4A and 4B. Registers R0 through R15 in the register file 82 receive the SHXXH signals from shifter 78 (FIG. 12) through lines 1196. The A1, A2, Q1 and Q2 registers are also connected to receive the SHXXH signals by lines 1300, 1302, 1304 and 1306. The D0O, TA and TB registers also receive the SHXXH signals on lines 1308, 1310 and 1312. The status word register 130 and the CS register 1314 are respectively connected by lines 1316 and 1318 to receive 12 and 4 of the SHXXH signals. The pending interrupt register multiplexer 1320 and the mask register 270 are connected to receive the SHXXH signals by lines 1322 and 1324, respectively. The fault register 252 is connected to receive the SH00H through SH04H signals by lines 1326. These same signals are supplied through B2 to configuration register 1042.

The R0 through R15 registers in register file 82 receive the EA00L through EA07L and EB00L through EB07L signals on lines 1328, 1330, 1332 and 1334. Even numbered registers R0 through R14 receive the even numbered RC0L through RC14L signals on lines 1336. Odd numbered registers R1 through R15 receive the RC1L through RC15L signals on lines 1338. Even numbered registers R0 through R14 are connected to bus 1340 by lines 1342. The even numbered registers R0 through R14 are also connected to bus 1344 by lines 1346. Odd numbered registers R1 through R15 are connected to bus 1348 by lines 1350. The odd numbered registers R1 through R15 are also connected to bus 1352 by lines 1354.

The A1 register is connected to buses 1348 and 1352 by lines 1356 and 1358. The A1 register is also connected by line 1360 to supply the A1D1L, A1D2L and A1D3L signals to detection logic and sign flipflop 1362. The A1 register receives the EA08L, EB08L, A1C1L and CLRAH signals on lines 1364.

The A2 register is connected to the buses 1340 and 1344 by lines 1366 and 1368. The A2 register supplies the A2D1L, A2D2L and A2D3L signals to detection logic and sign flipflop 1362 on lines 1370. The A2 register receives the EA08L, EB08L, A2C1L, A2C2L, A2C3L, SR22L, A215L and CLRAH signals on lines 1372. The A2 register receives the AL14H and AL15H signals from ALu 62 through B1 and lines 1168. The A2 register also receives the Q100L signal from the Q1 register on line 1374.

The Q1 register is connected to bus 1348 by line 1376 and to bus 1352 by lines 1376 and to bus 1352 by lines 1378. The Q1 register supplieds the Q1D1H and Q1D2L signals to detection logic and sign flipflop 1362 on lines 1380. The Q1 register supplies the Q114H and Q115H signal on lines 1382 to the Q2 register. The Q1 register receives the EA09L, EB09L, Q1C1L, Q1C2L, SQR2L, SQL1L, SR24L, SR25L and NSR2L signals on lines 1384. The Q1 register receives the Q200H signal on line 1386 from the Q2 register. The Q1 register receives the AL06H, AL07H, AL14H and AL15H signals from ALU 62 through B1 on four of the lines 1168 (see also FIG. 12).

The Q2 register is connected to bus 1340 by lines 1388 and to the bus 1344 by lines 1390. The Q2 register receives the SR23L, ALLDL, SQL1L, SQL2L, EA09L, EB09L, Q2C1L and Q2C2L signals on lines 1392. The Q2 register receives the AL14H and AL15H signals on lines 1394 and the DVQBH signal on line 1396. The D00 register is connected to the bus 1340 by lines 1398 and to the bus 1344 by lines 1400. The D00 register receives the EA10L, EB10L and D00CL signals on lines 1402. It supplies the D0SGH signal on line 1404.

The D01 register is connected to the bus 1348 by lines 1406 and to the bus 1352 by lines 1408. The D01 register receives the EA10L, EB10L and D01CL signals on lines 1410. The timer A (TA) register is connected to bus 1340 by lines 1412. The TA register receives the STMAL, EA14L and LDTAL signals on lines 1414. It supplies the TAM1H signal on line 1415. The timer B (TB) register is connected to bus 1352 by lines 1416. It receives the EA14L, STMBL and LDTBL signals on lines 1418 and supplies the TBM1H signal on line 1420. The status word (SW) register 130 is connected to bus 1340 by lines 1422. The SW register 130 receives the EA13L signal on line 1424 and the SW001 signal on line 1426. It supplies the ST00H through ST03H signals on lines 1428. The SW register 130 supplies the AS0 through AS3 and AK0 through AK3 signals on status bus 330 (see also FIG. 3). The CS register 1314 receives the EABOL, NRDTH and EA13L signals on lines 1430 and the ASLGH and ALZRH signals on lines 1432. It also receives the SPZSH and DPCSH signals on lines 1434. Outputs from the CS register 1314 are supplied to bus by lines 1436. The pending interrupt register (PIR) 250 is connected to bus 1340 by lines 1438. The PIR 250 is connected to PIR multiplexer 1320 by lines 1440. The PIR 250 receives the NCKDL and EA11L signals on lines 1442. Outputs from the PIR 250 are supplied on lines 1444, 1446, and 1448 to PIR multiplexer 1320, or gate 1450 and edge sense flipflop 1452. The PIR multiplexer also receives the output of or gate 1450 on lines 1454 and the PIMXH signal on line 1456. Additional inputs to the or gate 1450 are supplied by the edge sense flipflop 1452 on lines 1458, the TIMAH, TIMBH and FXOVH signals on lines 1460 and the external IOL1 INT and IOL2 inputs on lines 316 (see also FIG. 3).

Additional inputs to the edge sense flipflop 1452 are provided by the SSLEH, INTAL and FCLEH signals on lines 1462. The external USR0 through USR5 and PWRDN INT signals are supplied to the edge sense flipflop 1452 on lines 310 and 312 (see also FIG. 3), and directly to or gate 1450 on lines 1464. The or gate 1450 also receives the MAERH signal on line 1466 from or gate 1468. Or gate 1468 is connected to fault register 252 by lines 1470.

Mask register (MK) 270 is connected to bus 1352 by lines 1472. MK 270 receives the MKCKL and EA11L signals on lines 1474. The MK 270 supplies inputs on lines 272 to mask and enable circuit 268. The mask and enable circuit 268 also receives inputs from PIR 250 on lines 266. The remaining input to mask and enable circuit 268 is the EN1HL signal on line 1482. The outputs of mask and enable circuit 268 are supplied to priority circuit 278 by lines 276. The remaining input to priority circuit 278 is the SBEXL signal on line 1488. Outputs from the priority circuit 278 are supplies to the IPTX2 register 282 on lines 280. Priority circuit 278 also supplies the INBSH and INBRH signals on lines 1494. The remaining inputs to the IPTX2 register are the EA12L and LTENL signals on lines 1496. The output of IPTX2 register 282 is the HA11L through HA14L signals supplied on lines 284 to bus 1352.

Fault register 252 is connected bylines 1500 to bus 1340. Internal and external edge faults circuit 1502 and external level faults circuit 1504 of fault register 252 are connected to lines 1500 by lines 1506 and 1508, respectively. Outputs of the internal and external edge fault circuit 1502 are also connected by lines 1510 to or gate 1512. Outputs of the external level fault circuit 1504 are connected to or gate 1514 by lines 1516. Inputs to the internal and external edge fault circuit 1502 are provided by the NCKDL, EA12L and EAB0L signals on lines 1518, and by the output of flip flop 1512 on line 1520. Inputs to the external level fault circuit 1504 are provided by the BBSYL and EAB0L signals on lines 1522 and by the output of or gate 1514 on lines 1524. The CLERH and NRDTH signals are supplied to fault register 252 on lines 1526 and 1528. The output of edge sense flipflop circuit 1530 is supplied on lines 1532 to or gate 1512. The remaining signal to or gate 1512 is the ILPPH signal on line 1534, which is also supplied on line 1536 to abort logic 1538. The inputs to edge sense flipflop circuit 1530 are the SYSFLT1 and a SYSFLT0 external signals supplied on lines 326. The externally supplied EXT ADR ER, MEM PAR ER and MEM PRT ER signals are supplied on lines 320, 322 and 324 to OR gate 1514. They are also supplied on lines 1540 to abort logic 1538. The CPBSL, FETDH, NMCYH and S1ILH signals are supplied to abort logic 1538 on lines 1542. Abort logic 1538 provides the external MAJ ER and UNRCV ER signals on lines 340 and 338, respectively to signal the occurrence of major or unrecoverable errors as defined above. Abort logic 1538 also provides the ABOTH and ABRTH signals on lines 1544.

Constants ROM 120 includes the WO0, WO1, and K0–K7 circuits. THe K7 circuit is connected to the WO0 circuit by lines 1546. The EB11H through EB15H signals are supplied to the constants ROM 120 on lines 1548. The WO0, K0, K2, K4 and K6 circuits of contants ROM 120 are connected to bus 1344 by lines 1550. The WO1, K1, K3, K5 and K7 circuits are connected to bus 1348 by lines 1552.

Buses 1340 and 1352 are respectively connected to nand gates 1554 and 1556 in A bus multiplexer 1558. The other inputs to nand gates 1554 and 1556 are the EAB0L and EAB1L signals on lines 1560 and 1562, respectively. The outputs of nand gates 1554 and 1556 are supplied on lines 1564 and 1566 through B3.

Buses 1344 and 1348 are respectively connected as inputs to nand gates 1568 and 1570 in B bus multiplexer 1572. The other inputs to nand gates 1568 and 1570 are supplied by the EBB0L and EBB1L signals on lines 1574 and 1576, respectively. The outputs of nand gates 1568 and 1570 are supplied on lines 1578 and 1580 through B5.

Details of the circuits for overflow handling in execution of the modified Booth multiplication algorithm are shown in FIG. 14. ALU 62 is connected to overflow circuits 1600 forming a part of the ALU 17th stage 1062 and overflow logic 1152. The ALU 17th stage adder 1602 receives the BX00L signal from shifter 1066 and the AX00L signal from byte mask 1054 (not shown) on line 1060. The remaining input to adder 1602 is the ALCOL signal on line 1144 from the ALU 62 which represents the carry out from the 16th stage of the ALU. The ALU 17th stage adder 1602 provides a carry out signal on line 1604 as one input to exclusive OR gate 1606. The other input to gate 1606 is the 16th stage carry out signal ALCOL on line 1608. The gate 1606 detects an overflow condition in the ALUth stage by comparing the carry out signals from the 16th and 17th stages of the ALU. The output of gate 1606 is provided as one input to exclusive OR gate 1610 on line 1612. The other input to exclusive OR gate 1610 is the output of the adder 1602 on lines 1614 and 1616. The gate 1610 serves to invert the output bit from the ALU 17th stage if there is an overflow in the 17th stage. The output of the 17th stage is also supplied directly to the overflow multiplexer 1618 via the line 1614. This same signal is conditionally inverted by the exclusive OR gate 1610 by the input line 1616 and supplied as another bit to the overflow MUX 1618 on the line 1611. Two bits must be supplied to the overflow MUX on every Booth multiply cycle because a shift of two places is performed on every Booth cycle as is well known to those skilled in the art.

The 17th stage of the ALU eliminates overflows in those instance during execution of the Booth algorithm when the three least significant bits monitored by the Booth encoder 1074 in FIG. 12 dictate that twice the multiplicand must be added for the next partial product. By eliminating the possibility that an overflow condition can occur in this instance, the presence of the 17th stage eliminates the overhead associated with recovery from the overflow condition. The overhead eliminated is the time in machine cycles that it takes the branch PLA 180 in FIG. 1A to recognize the overflow condition and cause a branch to the routine in the microcode that causes recovery from the overflow. Since the multiplication operation is by far the most important mathmatical operation performed by a computer and occurs frequently, these savings on overflow recoveries that do not occur during Booth algorithm multiplications substantially increase machine speed.

Overflows from the 16th stage are corrected as follows. The ALCOL signal is also supplied on line 1620 as one input to exclusive OR gate 1622. The other input to gate 1622 is the ALCOH signal on line 1156. These two input signals to the exclusive OR gate 1622 represent the carries from the two most significant bit stages of the ALU. The output from gate 1622 is supplied on line 1624 as one input to exclusive OR gate 1626. The other input to gate 1626 is the AL00L signal on line 1140 which is the sign bit of the ALU 16 bit output word. The output of the gate 1622 serves to cause the gate 1626 to invert the sign bit on the line 1140 in case of an overflow condition as indicated by the two inputs to the gate 1622. The output of gate 1626 is supplied on lines 1628 as inputs to the multiplexer 1618. The select input to multiplexer 1618 is the BES1H signal on line 1170. This signal cause the MUX 1618 to select the lines 1611 and 1614 for output on the bus 1180 when there has been an "add two time the multiplicand" cycle in a Booth multiply. During all other types of Booth cycles and regular mathmatical operation cycles, the signal on 1170 causes the lines 1628 to be selected for regular overflow sign correction. The output of multiplexer 1618 is the SHM1H and SHM2H signals on lines 1180 which go to the post-ALU shifter 78 in FIG. 3 as the sign bit during regular adds and non-2X multiplicand add cycles during Booth multiply operations.

Figure 5:
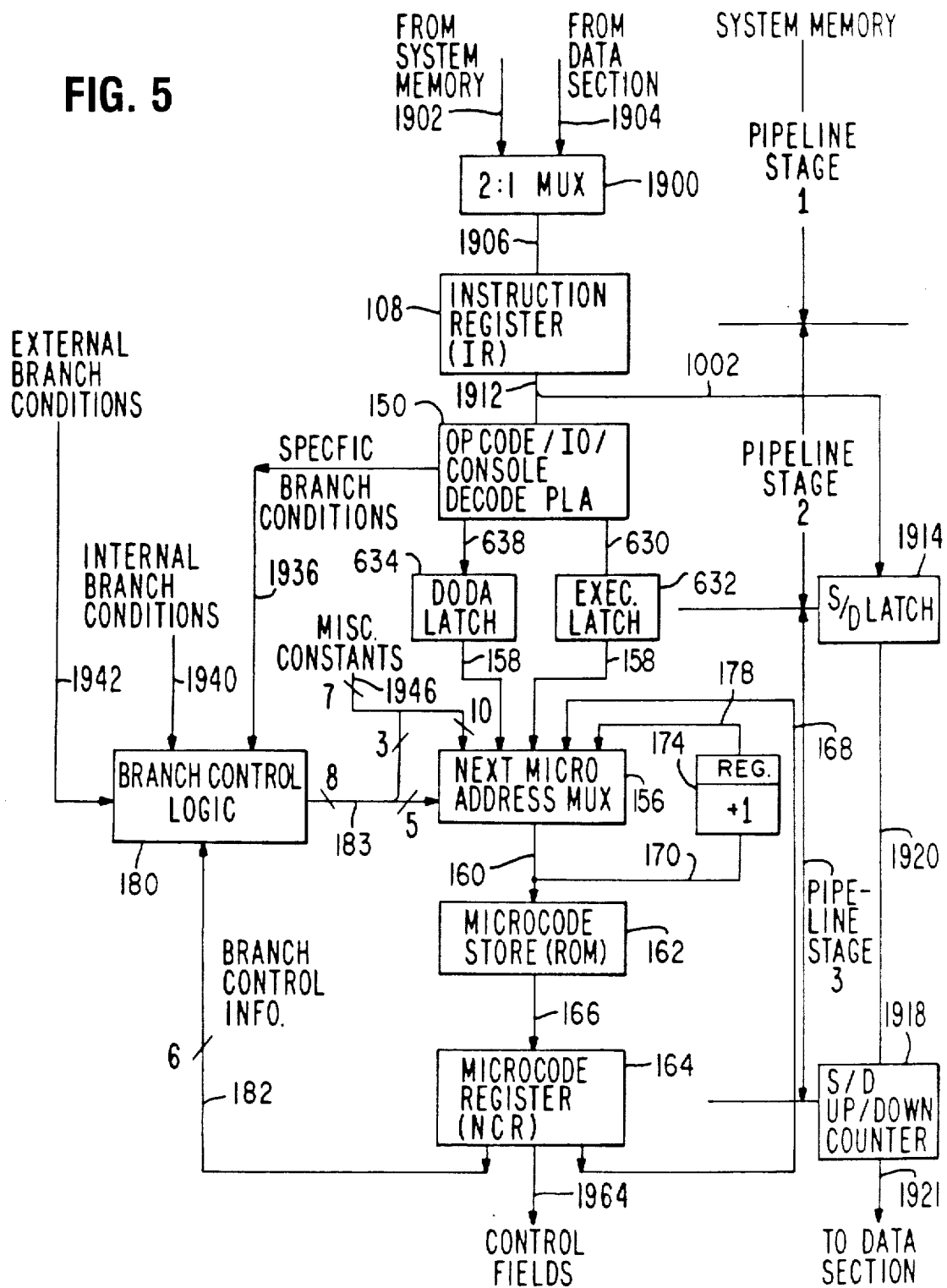
FIG. 5 is a block diagram of the control section of the microprocessor illustrated in FIG. 2B illustrating pipelining in the microprocessor and certain other aspects of the invention.

Further details of the branch PLA implementation shown in FIG. 2B are shown in FIG. 5. A 2:1 multiplexer 1900 receives inputs at 1902 and 1904 respectively, from a system memory and from a data section of the microprocessor. The multiplexer 1900 provides inputs on lines 1906 to instruction register 108. The instruction register 108 provides inputs to op code/IO/console decode PLA 150 on lines 1912, and to source/destination latch 1914 on lines 1916. Latch 1914 is connected to source/destination up/down counter 1918 by lines 1920. Counter 1918 provides outputs on lines 1921 to the data section of the microprocessor. PLA 150 provides outputs on lines 638 and 630 to a derived operand derived address (DODA) microroutine address latch 634 and an execution microroutine address latch 632. The DODA and execution latches are connected by lines 158 to provide inputs to a next microcode address multiplexer 156. PLA 150 is connected to supply specific branch condition inputs on lines 1936 to branch control logic 180. The branch control logic 180 also receives internal and external branch conditions inputs on lines 1940 and 1942, respectively. Branch control logic 180 provides outputs on lines 183, five of which are directly supplied to multiplexer 156, and three of which are combined with seven constants inputs on lines 1946 for supply to the multiplexer 156. Outputs of the multiplexer 156 are supplied on lines 160 to a microcode storage ROM 162, and on lines 170 to an incrementer 174. The output of incrementer 174 is supplied on lines 178 as an input to the multiplexer 156. Microcode outputs from the ROM 162 are supplied on lines 166 as an input to microcode register 164. Branch control information inputs are supplied by the microcode register 164 to the branch control logic 180 on lines 182. Control fields outputs are supplied by the microcode register 164 on lines 1964. Address inputs are supplied by the microcode register 164 to multiplexer 156 on lines 168.

There follows a more detailed discussion of the functioning of various aspects of the microprocessor.

PIPELINE CONTROL

The Op Code Mapping PLA 150 decodes an instruction supplied on the bus 152 by the instruction register (108, FIG. 12). As a result of this decode, the Op Code PLA generates two addresses, or pointers, for the microcode ROM. One pointer, "DODA", indicates the starting address of the microcode routine for calculating the effective address of an operand in external memory. The other pointer, EXEC, indicates the starting address of the microroutine for executing an operation involving the operand fetched by DODA. All DODA routines are located in a common memory area (03XX). As a result, six rather than ten address bits are required to select DODA from the microcode ROM 500. The four unnecessary NMA MUX input bits are forced to 03.

An instruction decode by the Op Code PLA results in the simultaneous output of DODA and EXEC to the respective DODA and EXEC latches (634, 632, FIG. 11B). The NEXT MICRO ADDRESS (NMA MUX) multiplexer 156, under control of the BRSEL field output from the controld store 162, first applies the DODA pointer as an address to the microcontrol store 162 to cause the routine to calculate the address for the operand to be used in the current instruction to begin execution. Then, after the operand address is calculated, the last instruction in the DODA routine causes the NMA MUX to select the output of the EXEC latch 632 for application as the input address to the microcontrol store 162 via the bus 160 in FIG. 11B. During the time the DODA routine was being executed, the EXEC pointer was caused to be latched in the EXEC latch 632 by the latch enable logic 566 and the miscellaneous latch 558 in FIG. 11B.

As referenced above, the selection of DODA or EXEC by the NMA MUX 156 is subject to control by the Branch PLA/logic 180 in response to the current contents of the microprogram register 164 in FIG. 11B. For example, the last microinstruction in a DODA routine contains six bits in the field denominated BRSEL ("Branch Select"), which is decoded as "select EXEC" and supplied on line 182 to the Branch PLA/logic 180. Similarly, other microinstructions cause the Branch PLA/logic 180 to select DODA. (The BRSEL fields for selection of the EXEC and DODA pointers is indicated at approximately lines 634 to 641 of the microcode control store listing of Appendix D).

The branch PLA/logic 180 in FIG. 11B also detects an indication of a satisfied branch condition to cause the NMA MUX 660 to gate a "next address" field in the microcode register to the address inputs of the microcode ROM, thus achieving a branch to another microcode address. The incrementer register 172 defines the next micro address by incrementing the present address by one during normal sequential processing where no branch condition occurs. Its output is selected by the NMA MUX 156 as a default condition. The Branch PLA/logic 180 also responds to various branch conditions indicated by signals on the bus 184 in FIG. 11B such as a signal indicating an interrupt is to be processed or to a reset signal or to the abort signal ABRTH from the abort logic 1538 in FIG. 13B indicating that an abort condition has been detected. These signals to the branch PLA/logic 180 cause it to assume an internal state with outputs on the bus 183 to cause the NMA MUX 156 to select the appropriate microcode address for handling the respective branch condition, processes to be discussed in more detail hereafter.

The pipeline architecture of the control section also includes a dynamic reconfiguration capability. A "transparency" control is provided by the Op Code Mapping PLA 150 via one of its output signals designated DOAMH on the bus 580 in FIG. 11B coupled to the miscellaneous latch 558. Through this control, the EXEC and DODA latches 632, 634 are, in certain circumstances, rendered transparent, i.e., the mapping PLA output pointers are passed directly to the NMA MUX 156 without the delay in the instruction execution caused by these latches. This eliminates one level of pipelining and expedites processing of certain types of instructions. This feature also conserves chip area in saving for other uses the silicon area which would be consumed by do nothing DODA routines for instructions where no DODA routine was needed. The transparency control is activated when an instruction does not require a DODA routine because the address of the operand is already known as in a register-to-register instructions in which the two operands reside in registers.

Looking at the transparency control circuitry in more detail, the Op Code/Mapping 150 detects that a macroinstruction does not require a DODA routine and, in response to this fact causes the NMA MUX 156 to immediately select the EXEC pointer without first selecting the DODA pointer and waiting for it to execute and select the EXEC pointer at the end of the routine. The Op Code PLA 150 provides the basic control signal DOAMH for this transparency control operation on bus 580. The Misc. Latch 558 latches the DOAMH signal, which, through logic 552 and 542 causes the Branch PLA/logic 180 to active selection of the EXEC Pointer by the NMA MUX 156. The Latch Enable Logic 566 controls whether the DODA and EXEC latches 634 and 632 latch their respective pointers or pass them straight through to the NMA MUX.

Concurrency in the pipeline in transparent operation may be further illustrated as follows. Instructions are fetched from system memory to the IR 108. Where the instruction has an op code which indicates that it is an instruction which requires no DODA since the operands are in registers and the result will be stored in a register, the register addresses are copied out of instruction register into the latch 1004 on FIG. 12. If a range of sequential registers is to be involved in multiple transfers, the starting register address is copied into either the S/D HI or S/D LO up-down counters 1012, 1014 (FIG. 12).

The ASRC, BSRC fields in the microprogram register 164 in FIG. 11B and the buses C4 and C5 coupling the A Address Multiplexer 712 and the B Address Multiplexer 722 to the counters 1012 and 1014 are then used by the execution routines in the microcontrol store 162 to select these S/D HI and S/D LO counters 1012, 1014 as the source and destination registers for the A bus and B bus. In this manner any register direct or memory direct instruction or move multiple type instructions can affect a range of registers without having to go through a DODA routine to address each one. That is, in instructions such as "move multiple" where a number of registers are to be addressed sequentially, the S/D HI and S/D LO up-down counters can be incremented or decremented to change the address of the register to be addressed in any given cycle. In this way a whole range of registers can be sequentially addressed without having to go through DODA routines to derive the address for each register. This saves useless DODA cycles and silicon area in the microcontrol store 162. The SDCTL field in the microprogram register 164 and the bus C3 on FIGS. 11A and B are used by the execution routines for these types of instructions affecting ranges of registers to increment or decrement the S/D HI and S/D LO counters 1012 and 1014 in preparation for execution of the next operation affecting a register. The ASRC and BSRC fields are then set by the microcode to cause, via the buses 710 and 720, the A Address Mux 712 and the B Address Mux 722 to select the addresses on the C4 and C5 buses from the S/D HI and S/D LO up-down counters 1012 and 1014. These addresses are then decoded by the decoders 802 and 806 on FIG. 11A to cause the proper registers to be enabled and coupled to the A and B buses such that their contents can be operated on by the ALU.

In the same cycle, the pointers generated by the previous instruction then residing in the instruction register 108 are passing through the DODA and EXEC latches 632, 634. Normally, DODA would pass through latch 634 and the EXEC pointer would be latched by latch 632 and selected in the next cycle by the BRSEL field 504 via the bus 182 to the branch PLA 180 in FIG. 11A during the last DODA microinstruction. When the mapping PLA detects the fact that this is a no DODA type of instruction it causes the EXEC pointer to be passed straight through the latch 632 and selected by the NMA MUX 156 as the input address for the microcontrol store 162 thereby eliminating the cycles normally needed to execute a DODA routine and the silicon area needed to implement the code for such a DODA routine. Without the transparency control just described, a register to register add or move and other such operations would take twice as long at least. Since there are typically many register to register operations in a typical program, this amounts to substantial savings in execution time for all programs.

Another advantage of the architecture discussed to this point is the ability to easily share microcode and the elimination of the delays and complication associated with microstack operations in the control section. These advantages arise from the use of separate DODA and EXEC pointers stored in the Op Code Mapping PLA 150. Since the same DODA will be common to many microinstructions, only one section of microcode in the microcontrol store ROM 162 is devoted to accomplishing calculation of the operand address for the operand fetch for any particular addressing mode. The DODA pointer then accesses this section of microcode for every instruction that uses that addressing mode. This approach differs from conventional stack mechanisms wherein, for example, the microcode would contain a pointer to the overall execution routine. The execution routine would then have to jump to a subroutine containing the DODA routine and the return address to resume execution of the execution routine would have to be stored in a stack for return purposes after the operand was fetched. Such a mechanism wastes machine cycles as compared with the disclosed approach and results in a greater number of lines of microcode. With each line of microcode comprising 60 bits, large amounts of silicon area which could be used for other purposes is consumed. The increased mapping PLA complexity is more than offset by these savings, particularly the savings in microcycles and microinstructions in a processor designed for high speed real time operation and high density fabrication. A great deal of chip real estate is saved by the invention, and thus more devices can be put on the same die without adversely affecting chip yield.

The Branch PLA/logic 180 of the preferred embodiment also represents a chip area conserving design. Typically, a conventional Branch PLA would handle internal branch conditions (carry, overflow, branch on negative or positive, etc.). The subject processor branch PLA/logic 180 is designed to handle other novel internal branch conditions, as well as external branch conditions. The latter include reset (534), abort (ABRTH), console (532) and an OR of all interrupts (INT), while the former include sticky bit (STKYH); floating point normalization (ANMIH, 2H) and floating point overflow (EUDFM, EOVFM and ALOVM). Rather than have one PLA handle all branch conditions, as in some known prior art processors, discrete logic follows the PLA and overrides it in the case of external branch conditions, while a PLA handles the internal branch conditions. For external branch conditions such as interrupt, the interrupt priority encoder 278 in FIG. 1B generates one bit that signals the branch PLA that there has been an interrupt and sequential processing must be stopped and the type of interrupt determined and the proper routine to service that interrupt must be addressed. It is very wasteful of chip area to run a such a signal line to every term in the PLA. Similar situations exist for abort and reset functions. To avoid this waste, discrete logic included within the block 180 on FIG. 11B was included to handle such external interrupt conditions. In this manner, the PLA is reduced in size and chip area is conserved..

Another feature to be noted in the subject microprocessor architecture, is that the instruction register (IR) 108 can be written to by the ALU 62 via the ALU bus, the bus 100, the MUX 92 and the bus 106 as best shown in FIG. 1. Further, an external console can write to the instruction register via the information bus 102, the bus 104, the A bus, the MUX 92 and the bus 106. A console code or ALU output may be read into IR 108 in the same manner as an instruction feteched from memory. The Op Code Mapping PLA 150 in turn will decode the ALU output or console request in the same manner as an instruction fetched from system memory.

This structure permits internal instruction generation which proves advantageous in: (a) internal creation of I/O instructions, and (b) efficient self-testing through internal Op Code generation. A new I/O instruction can be created by, for example, adding the contents of a selected register to the I/O device address field in an I/O instruction extracted from memory. To create a new I/O instruction, the ALU 62 adds the I/O device address contained in the instruction register 108 to the selected register's contents and places the new I/O device address back into the instruction register 108. This structure allows very efficient polling of a large number of I/O devices without the need for writing and storing in external RAM large numbers of separate I/O instructions for each device. A savings in memory results because only one I/O instruction need be stored, rather than two or more. This structure also speeds up operations where many I/O devices having sequential addresses in a mapped I/O application are to be polled, because it saves the access time needed to write the address of the next I/O command to the external RAM, wait for the external RAM to retrieve the instruction and place it on the information bus. Any time a bus access to the external world can be eliminated, time is saved because the time needed to charge up the capacitances associated with the bus is eliminated, as is the time needed by the external device to respond to the request on the bus. Moreover, additional programming flexibility is provided by this capability of the microprocessor to internally generate I/O commands.

In the self test mode an internal test of substantially all of the operations of the processor can be triggered by reading of a self test instruction into the IR 108 from an external console connected to the information bus. A synthetic instruction for exercising the processor is then generated by the ALU 62 by shifting and masking words stored in the constant ROM 120. The internally generated instruction is read into the IR 108 for execution followed by a sequence of microinstructions that comprise the self-test routine. Ultimately, a bit is set in the fault register to indicate whether the test was passed.

Advantageously, the EXEC pointers in the Op Code Mapping PLA 150 related to console initiated testing are stored in DODA positions of instruction Op Codes which require no DODA routine. This conserves chip area in the mapping PLA. The console request line 532 (FIG. 11B) then instructs the Branch PLA/logic 180 to select the 6 DODA bits as the EXEC pointer. Unused DODA bit positions DK03M to DK06M are also used to store control code instructions for selectively enabling a number of control flip-flops 656. These flip-flops 656 control, for example, interrupt enable, DMA disable, timer A start/stop and timer B start/stop.

MICROCODE WORD FIELDS

The microcode output from the microcontrol store 162 for any particular microcode routine comprises a stream of 60-bit words divided into functional fields. Each field controls different logic blocks in the microprocessor in such a way that some or all the blocks work together in unison to accomplish the particular funtion being implemented by the stream of microcode words. The fields are defined in the first pages of Appendix D and the particular codes are given for each particular operation controlled by that field. These fields are now discussed with a view to a more comprehensive understanding of the operation of the machine.

The first group of fields discussed are those most directly concerned with ALU operation: The ALU field, the ASRC and BSRC fields, the APRA and BPRA fields and the Destination Field, all stored in the microprogram register 164 in the sections with the same abbreviation as shown on FIG. 2B.

The 4-bit ALU field provides for 16 different ALU mathematical or logical operations including, typically, Exclusive-Or, And, Add and so on, as well as instructions permitting the ALU to work on 8-bit bytes useful in floating point operations. The ALU field is supplied via a bus 728 to a decoder 730 which decodes its output into six control bits on control lines bus C8 in FIG. 2A. Three of the C8 control lines NAL0H, NAL2H, N157H, go to the ALU 62 in FIG. 3 and control carry input 7 or 15 and the logic operations EX-OR, OR, AND. The line N157H also controls the shifter 1066. A fourth of the control lines C8 goes to the Booth Encoder 1074 (FIG. 12) as NAL1H and controls add/subtract. The fifth and sixth of the control signals NCINH and NCMXH go to the quotient bit generator and carry logic 1132 (FIG. 3) to control the carry-in function to the ALU, e.g. for the two's complement subtract operation.

The ASRC and BSRC fields are 6-bit register-select fields. They essentially determine which registers are coupled to the respective A and B buses 66 and 70 coupled to the inputs of the ALU 62. All of the registers of FIG. 4A plus all other logic units coupled to the A and B buses can be connected to these buses when their particular codes appear in the ASRC and BSRC fields. The units which can be coupled to the A and B buses in this manner include the sixteen registers R0 . . . R15 of the register file, the temporary registers, and A registers, the Q registers (FIG. 4A) and the other user transparent registers—including interrupt related registers such as the mask register 270, the priority register 250, and IPTX2 register 282 (FIG. 4B). Multiplexing of these registers onto the buses is accomplished by tristate devices.

The 6-bit ASRC field is applied to the A address decoder 802 via bus 710 and A Address Multiplexer 712 in FIG. 2B, and the BSRC field is supplied to the B address decoder 806 via the B Address Multiplexer 722 and the bus 720 in FIG. 2B. The A address multiplexer 712 and B address multiplexer 722 also each receive inputs from the C4 and C5 control buses 716, 718 which output respectively from the S/D HI and S/D LO addressing counters 1012, 1014 of FIG. 12 such that the counts in these counters can be selected as the address for the A and B Address Decoders. The B Address Multiplexer 722 receives an additional input from control bus C6, 724, emanating from the Constant ROM Address Logic 1084 of FIG. 12. The B address Multiplexer also provides a signal CRREL output on control line C7, 725, to the Constant ROM Address Logic 1084.

The outputs of the A Address Multiplexer 712 and the B address multiplexer 722 are supplied to respective A and B Address Ddecoders 802, 806 which generate register select signals. These signals are used to select a particular register in FIG. 4A for connection to the respective A and B buses. For example, the B Address Decoder produces outputs EB00L to EB007L which are coupled to the registers R1 to R15 and R0 to R14 of FIG. 13A, as are EA00L to EA07L of the A Address Decoder 802. The C6 and C7 control buses from the B Address Multiplexer 722 carry the control signals which cause selection and generation of the desired constant from constant ROM through the operation of the Constant ROM Address Logic 1084 which controls certain functions of the Pre Shifter and Mask 66.

A one-bit destination field, DEST, provides the flexibility to return the result of an ALU operation to either the register specified by the ASRC field or the one specified by the BSRC field. Thus, if add A+B is performed, the result may be returned either to the register which originally stored the A operand (determined by ASRC) or the origin of the B operand (determined by BSRC). In prior machines, the destination of the ALU output was predetermined, and if the result was needed elsewhere, then a move instruction would have to be executed. The present structure eliminates this need in some cases. The output of DEST is indicated as the NRDTH signal, and is applied to the CS register 1314 (FIG. 4B) and causes it to load status information. NRDTH is also applied to the instruction register 108 (FIG. 3) and causes it to load at certain points.

Two fields, APRA and BPRA, are used to control pre-ALU shifting and masking operations by the PALA byte mask 1054 and the Pre Shifter and Mask 66 of FIG. 3 on words moving to the respective A and B inputs of the ALU 62. As shown in FIG. 12, a byte mask 1054 operates on the input to the "A" ALU input, while a shifter and mask 1066, 1068 operates on the "B" input. These shifting and masking operations are helpful in floating point operations in extended precision format and in Booth algorithm multiplication as will be explained more fully below. The APRA field is a two-bit field supplied to the byte mask 1054 on control bus C10. This field selects whether the entire 16-bit word is masked, whether the first eight or second eight bits are selected, or whether the entire 16-bit word is passed through to the ALU 62. In addition to provided the BPRA masking functions, the 4-bit BPRA field provides control of a shifter 1066, and provides for more selective masking of the B input to the ALU. This is useful to performance of a high-speed Booth algorithm discussed in more detail below. The BPRA field is supplied over control bus C11 to Constant ROM address logic 1084 which supplies nine control lines to the shift and mask circuitry 66.

The shifter 1066 enables generation of certain constants from those already stored in the constant ROM 120 of FIG. 13B, thereby conserving chip area by enabling some 23 constants needed in processor operations to be generated by only 8 stored constants. The remaining constants are generated by shifting the ones stored in the constants ROM 120. Left-shifting, for example, accomplishes a multiply-by-two operation on a constant. Masking also enables operations that require one operand to be zero, i.e., add zero to the B input and store to a different location, or operations that operate on 8 bit operands such as 24-bit floating point operation (16-bit mantissa, 8-bit exponent) and 48-bit extended precision floating point operation (40-bit mantissa, 8-bit exponent).

The 5-bit Shift Field on the bus 726 of FIG. 2B controls all shifter functions. The shift field codes are given starting approximately at line 179 of Appendix C. As seen there, the shift field is coded for byte swap, left and right rotate, and right and left logical shifts. These operations are useful for communication applications dealing with serial ports and other logical and arithmetic operations as are well known in the art. The shift field is supplied to a shift decoder 1174 on control line C9 shown on FIG. 3 which decodes the shift field and supplies control signals to other logical units to cause the requested shift operations to happen.

The 3-bit SDCTL field controls decrementing and incrementing of the S/D HI and the S/D LO up-down counters on FIG. 3 which are used to speed up addressing of successive registers in the register file. This saves chip area in the control store 162 for operations involving internal registers as the source or destination or both. For example, in the case of an instruction with a register direct addressing mode, the two operands will be the contents of two internal registers and the addresses of these two registers containing the operands will be the bits specified in the RA and RB fields of the instruction (see the convention for the register direct addressing mode of the section of Appendix A specifying the available addressing modes.).

In Appendix A, a field name surrounded by parentheses means the operand is the contents of the register specified by the bits in the field, e.g., (RB) means the operand stored by the register specified by the RB bits. A field name surrounded by brackets means the operand is the contents of the memory location with the address specified by the bits of the field, e.g., [A] means the operand will be found in the memory location at address A. The derived address will either be the address specified by the bits of a field, e.g., the RB field bits, or will be the contents of a register specified by the bits of the field, e.g., (RB), or will be the contents of a memory location having the address specified by the bits of the field, e.g., [A] or [A+(RX)], the latter notation meaning the derived address is the contents of the memory location having the address specified by adding the contents of the A field to the contents of the register specified by the RX field of the instruction.

It is more efficient in terms of time and chip area used to derive the address of an operand known to be stored in a register to divert the address of the register contained in the op code to a separate register directly from the instruction register rather than computing it through a DODA routine specified by the mapping PLA. This saves the space needed to store the unneeded DODA routine and saves the time of executing the DODA routine. No routine to compute the address of the desired operands and to fetch these operands from memory is needed where the addresses are already contained in the instruction fields and the operands are already present in various internal registers in the machine. In such a case where no DODA routine is needed, the mapping PLA will be able to determine this fact from decoding the op code of the instruction. In such a case, the signal DOAMH on the bus 580 from the mapping PLA 150 will cause the latches 634 and 632 to be transparent and will cause the multiplexer 156 to pick the EXEC pointer immediately instead of picking the DODA pointer first. The microcode of the execution routine will cause the S/D HI and/or S/D LO counters 1012 and 1014 to load the addresses of the registers containing the operands directly from the instruction register 108 thereby bypassing the DODA calculation circuitry of the pipeline, and will set the BSRC or ASRC fields to select the S/D HI and/or S/D LO counters (lines 328, 329; 372, 373 Appendix C) as the source of the addresses for the operands. As an example of the improved efficiency of this circuitry, it may be desired to move the contents of registers 5 through 15 to memory. The address "5" would be loaded into one of the S/D HI up-down counter 1012 or the S/D LO up-down counter 1014 via the bus 1002 and the latch 1004 in FIG. 12 and thereafter these counters would be incremented in accordance with the SDCTL code instructions. In another application "move multiple," one of the registers may be used for the starting register and the other for a number such as "seven" representing the total number of registers to be moved. The register addressing would proceed as above described.

To permit the foregoing operation, the SDCTL field is applied to S/D LO on control bus C3. The S/D HI up-down counter 1012 and the S/D LO up-down counter 1014 store a 4-bit portion of the instruction register output. These 4-bit portions are latched by a latch 1004. Incrementing of these 4-bit addresses is then controlled by the counters responsive to the SDCTL field supplied on control line C3 to blocks 1014, 1012. The output of the S/D HI up-down counter 1012 appears on control line C4 and on the B3 bus coupled to the A Address Multiplexer 712. The output of the S/D LO up-down counter 1014 appears on control bus C5 and on the B5 bus coupled to the B Address Multiplexer 722.

This address calculation bypassing technique and circuit is useful in moving and loading multiple registers or even single registers. For example, registers may be moved to memory in the order 4–15, 1, 2, 3. A cursory examination of Appendix A will show that many of the instructions available can use addressing modes which involve one or more operands stored in an internal register. It will be apparent that the savings in machine cycles in executing programs which use such instructions heavily, as most programs do, from the above structure and method can be substantial.

The 3-bit MEM I/O field, defined at line 245 et. seq. of Appendix C, controls all bus operations, e.g. read or write, I/O or memory, and virtual memory operations wherein execution is aborted when a called-for operand is not present in external RAM and bulk storage memory must be accessed. It further handles the case where an abort occurs in the middle of executing a multiple-word instruction. In such case, the instruction counter (IC) 200 must be backed-up to the first word of the instruction, as described in more detail below.

According to the control store assembler, Appendix C, page 14, the three bits of the MEM I/O field control the MDR (memory data register) multiplexer 92 (FIG. 12); i.e., they select the information bus 102 or the ALU bus as input to the Multiplexer 92. Lines 255–259 relate to abort handling on multiword fetches and updating of the instruction counter 200.

The 5-bit IMACMD field controls the address processor area 56 including controlling transfers between the ALU 62 and the Memory Address Register 216 which stores the derived address for operands as calculated by the DODA routines. This field also controls transfers between the instruction counter 200 and the memory address register (MAR) 216 and controls operation of an incrementer 210 and transfers from it to the MAR 216 and the IC 200 all shown in FIG. 3. The IC 200 normally contains the instruction address, except in branching operations. In branching, the MAR 216 stores the address where instruction fetching operations commence after the branch. Use of two registers, MAR and IC, permits incrementation of the instruction counter at the same time an operand is fetched to speed up processing. Once the IC 200 is incremented, it typically retains the same count for many machine cycles until a new instruction is fetched The IMA CMD code controls such operations as incrementing MAR, transferring MAR+1 to the IC, transferring ALU output to IC, and Booth operations. The IMA CMD field may be used for other miscellaneous functions when the MAR 216 and IC 200 are idle. This sharing helps reduce the microcode storage area. In many cases, the MAR 216 is inactive since many instructions do not require a memory access.

The 5-bit PINS field is used to control miscellaneous operations such as interrupt enable, disable and acknowledge Page 13 of Appendix C shows that when a fetch is specified in the PINS field, the IMACMD field specifies whether the IC 200 or MAR 216 is to be used for the address. Bus requests, console operation, interrupt handling and Q register shifting are also affected by the PINS field (page 15, Appendix C).

Finally, the microprogram register 164 contains a Next Address field (lines 648+, Appendix C) and the Branch Select field BRSEL. The Next Address field indicates a branch address in the microcontrol store 162 that processing should be vectored to and is supplied as an input to the NMA Multiplexer 156 via the bus 168. The BRSEL field controls which input the NMA MUX is to select for supply to the microcontrol store 162. To further illustrate the application of the microcode and Appendix C, an exemplary machine operation, EX-OR, will be described. An EX-OR instruction is performed in one machine cycle (page 36, Appendix C). The contents of the register pointed to by R/S HI 1012, FIG. 3, are provided to the A bus and the contents of the MDR (temporary) register 978 are provided to the B bus. EX-OR is then performed by the ALU and the result returned to the register pointed to by R/S HI. The ALU condition, if any (carry, overflow) is stored in the CS register 1314 on FIG. 3. Finally, the next instruction is fetched.

Shared Code

Many of the floating point and other mathmatical operations performed by the microprocessor have long sections of code which are identical such as DODA routines, alignment of the mantissas and normalization operations. For example the floating point add routine employs 33 micro-instructions. See Appendix C, beginning at Page 163. Much of this routine is identical with and can be shared by the floating point subtract and compare operations.

The microprocessor of the invention employs a technique for sharing floating point microcode and DODA routines which are common among several instructions. This aspect of the invention eliminates the overhead of a stack mechanism. The ability to share code arises because many steps in the microcode routine for various floating point instructions and in the DODA routines for various instructions are common. For example, floating point add and subtract require alignmnet to equalize exponents prior to addition or subtraction and to achieve normalization of mantissas subsequent to these operations. Alignment and normalization may require on the order of thirty microinstructions whereas the actual add/subtract portion of the overall routine may require only two or three microinstructions. Thus, a great potential for saving space in the microcontrol store ROM 162 is realized by sharing code, and an additional reduction in overhead cycles is achieved by accomplishing code sharing without a stack mechanism.

The stack mechanism is avoided by the use of two pointers, one for DODA and one for EXEC routines and from special signals emanating from the Op Code/Mapping PLA 150. This control is effected by PLA outputs FLPOL and FLPIL which determine the output bits FLT0 and FLT1 from the miscellaneous latch 558. These bits FLT0 and FLT1 are input to the Booth Encoder 1074 of FIG. 3 and are available to tell the Booth Encoder what type of floating point operation is called for by the instruction so that the Boot Encoder can control the ALU accordingly. Control bit FPASL generated by the IMACMD decoder 758 of FIG. 2A from the IMACMD field in the microcode word stored in the microprogram register 164 is also supplied on input 1210 to the Booth Encoder 1074. This FAPSL signal causes the Booth Encoder 1074 to look at the FLT0H and FLT1H signals from the Miscellaneous logic 542 to determine the type of floating point operation is desired and to send to the ALU 62 via line BAL1H the proper control signal to perform an add or a subtract on the inputs to the ALU 62. This operation occurs after processing of the common portions of the microcode are completed when the microcode output word contains the proper IMACMD field to cause the Booth Encoder to examine the two signals mentioned above derived from the instruction by the Mapping PLA 150. That is, when a floating point instruction comes in to the mapping PLA which uses a shared portion of code, the two signals from the mapping PLA signal the Booth Encoder that such is the case. Then after processing of the common portions has occured the appearance of the FPASL signal the IMACMD field tells the Booth Encoder to cause the ALU to ignore the ALU field of the microcode and do the mathmatical operation requested by the Booth Encoder. The ALU has three sources of control then. On floating point multiply, the ALU is controlled by the Booth Encoder 1074 alone. On floating point add, subtract and compare operations, the Mapping PLA and microcode control the ALU through the Booth Encoder. On all other operations, the ALU is controlled strictly by the ALU field of the microcode.

APPENDIX A

| Mnemonic | Addressing Mode | Function |
|---|---|---|
| Integer Arithmetic/Logic | | |
| A | R, B, BX, ISP, D, DX, IM | Single precision Add |
| DA | R, D, DX | Double precision Add |
| INCM | D, DX | Increment Memory by positive integer |
| ABS | R | Single precision Absolute value |
| DABS | R | Double precision Absolute value |
| S | R, B, BX, ISP, D, DX, IM | Single precision Subtract |
| DS | R, D, DX | Double precision Subtract |
| DECM | D, DX | Decrement Memory by positive integer |
| NEG | R | Single precision Negate |

| | | |
|---|---|---|
| DNEG | R | Double precision Negate |
| MS | R, ISP, ISN, D, DX, IM | Single precision Multiply – 16-bit product |
| M | R, B, BX, D, DX, IM | Single precision Multiply – 32-bit product |
| DM | R, D, DX | Double precision Multiply |
| DV | R, ISP, ISN, D, DX, IM | Single precision Divide – 16-bit dividend |
| D | R, B, BX, D, DX, IM | Single precision Divide – 32-bit dividend |
| DD | R, D, DX | Double precision Divide |
| C | R, B, BX, ISP, ISN, D, DX, IM | Single precision Compare |
| CBL | D, DX | Compare between limits |
| DC | R, D, DX | Double precision Compare |
| OR | R, B, BX, D, DX, IM | Inclusive OR |
| AND | R, B, BX, D, DX, IM | AND |
| XOR | R, D, DX, IM | Exclusive OR |
| NAND | R, D, DX, IM | NAND |

Floating Point

| | | |
|---|---|---|
| FA | R, B, BX, D, DX | Floating point Add |
| EFA | R, D, DX | Extended precision Floating point Add |
| FABS | R | Floating point Absolute Value |
| FS | R, B, BX, D, DX | Floating point Subtract |
| EFS | R, D, DX | Extended precision Floating point Subtract |
| FNEG | R | Floating point Negate |
| FM | R, B, BX, D, DX | Floating point Multiply |
| EFM | R, D, DX | Extended precision Floating point Multiply |
| FD | R, B, BX, D, DX | Floating point Divide |
| EFD | R, D, DX | Extended precision Floating point Divide |
| FC | R, B, BX, D, DX | Floating point Compare |
| EFC | R, D, DX | Extended precision Floating point Compare |
| FIX | R | Convert Floating point to 16-bit integer |
| FLT | R | Convert 16-bit integer to Floating point |
| EFIX | R | Convert extended precision Floating point to 32-bit integer |
| EFLT | R | Convert 32-bit integer to extended precision Floating point |

Bit Operations

| | | |
|---|---|---|
| SB | R, D, DX, I, IX | Set Bit |
| RB | R, D, DX, I, IX | Reset Bit |
| TB | R, D, DX, I, IX | Test Bit |
| TSB | D, DX | Test and Set Bit |
| SVBR | R | Set Variable Bit in Register |
| RVBR | R | Reset Variable Bit in Register |
| TVBR | R | Test Variable Bit in Register |

Shift

| | | |
|---|---|---|
| SLL | R | Shift Left Logical |
| SRL | R | Shift Right Logical |
| SRA | R | Shift Right Arithmetic |
| SLC | R | Shift Left Cyclic |
| DSLL | R | Double Shift Left Logical |
| DSRL | R | Double Shift Right Logical |
| DSRA | R | Double Shift Right Arithmetic |
| DSLC | R | Double Shift Left Cyclic |
| SLR | R | Shift Logical, count in Register |
| SAR | R | Shift Arithmetic, count in Register |
| SCR | R | Shift Cyclic, count in Register |
| DSLR | R | Double Shift Logical, count in Register |
| DSAR | R | Double Shift Arithmetic, count in Register |
| DSCR | R | Double Shift cyclic, count in Register |

Load/Store/Exchange

| | | |
|---|---|---|
| L | R, B, BX, ISP, ISN, D, DX, IM, IMX, I, IX | Single precision Load |
| DL | R, B, BX, D, DX, I, IX | Double precision Load |
| EFL | D, DX | Extended precision Floating point Load |
| LUB | D, DX, I, IX | Load from Upper Byte |
| LLB | D, DX, I, IX | Load from Lower Byte |
| S | B, BX, D, DX, I, IX | Single precision Store |
| STC | D DX, I, IX | Store a non-negative Constant |
| DST | B, BX, D, DX, I, IX | Double precision Store |
| SRM | D, DX | Store Register through Mask |
| EFST | D, DX | Extended precision Floating point Store |
| STUB | D, DX, I, IX | Store into Upper Byte |
| STLB | D, DX, I, IX | Store into Lower Byte |
| XBR | S* | Exchange Bytes in Register |
| XWR | R | Exchange Words in Registers |

| Multiple Load/Store | | |
|---|---|---|
| PSH M | S* | Push Multiple registers onto the stack |
| POP M | S* | Pop Multiple registers off the stack |
| LM | D, DX | Load Multiple registers |
| STM | D, DX | Store Multiple registers |
| MOV | S* | Move multiple words, memory to memory |

| Program Control | | |
|---|---|---|
| JC | D, DX, I, IX | Jump on Condition |
| JS | D, DX | Jump to Subroutine |
| SOJ | D, DX | Subtract One and Jump |
| BR | ICR | Branch unconditionally |
| BEZ | ICR | Branch if Equal to (Zero) |
| BLT | ICR | Branch if Less Than (zero) |
| BLE | ICR | Branch if Less than or Equal to (zero) |
| BGT | ICR | Branch if Greater Than (zero) |
| BNZ | ICR | Branch if Not equal to (Zero) |
| BGE | ICR | Branch if Greater than or Equal to (zero) |
| BEX | ICR | Branch to Executive |
| LST** | D, DX, I, IX | Load Status |
| SJS | D, DX | Stack IC and Jump to Subroutine |
| URS | S* | Unstack IC and Return from Subroutine |
| NOP | S* | No Operation |
| BPT | S* | Breakpoint |
| BIF | S* | Built In Function (escape code) |

* S Special Format
** Privileged Instruction

Input/Output Instructions **

| Programmed Input/Output | | |
|---|---|---|
| XIO | IM, IMX | Execute Input/Output |
| VIO | D, DX | Vectored Input/Output |

| Timer Control | |
|---|---|
| TAS | Timer A Start |
| TAH | Timer A Halt |
| OTA | Output Timer A |
| ITA | Input Timer A |
| TBS | Timer B Start |
| TBH | Timer B Halt |
| OTB | Output Timer B |
| ITB | Input Timer B |

| Interrupt/DMA/Fault Control | |
|---|---|
| SMK | Set Interrupt Mask |
| CLIR | Clear Interrupt Request |
| ENBL | Enable Interrupts |
| DSBL | Disable Interrupts |
| RPI | Reset Pending Interrupt |
| SPI | Set Pending Interrupt Register |
| RMK | Read Interrupt Mask |
| RPIR | Read Pending Interrupt Register |
| RCFR | Read and Clear Fault Register |
| DMAE | DMA Enable |
| DMAD | DMA Disable |

| MMU Control | |
|---|---|
| WIPR | Write Instruction Page Register |
| WOPR | Write Operand Page Register |
| RIPR | Read Instruction Page Register |
| ROPR | Read Operand Page Register |

| BPU Control | |
|---|---|
| LMP | Load Memory Protect RAM |
| RMP | Read Memory Protect RAM |
| MPEN | Memory Protect Enable |

| MISC | |
|---|---|
| WSW | Write Status Word |
| RSW | Read Status Word |
| RNS | Reset Normal Power Up discrete |
| GO | Reset Trigger GO indicator |

** Privileged Instruction

APPENDIX B
MAPPING PLA TRUTH TABLE

←─────── OUT ───────→

|  | ←── IN ──→ | | | | ├─DODA─┤ | | ├── EXEC ──┤ | | |
|---|---|---|---|---|---|---|---|---|---|---|
| I.D. | IIIII ORRRR P0000 L0123 HHHHH | IIII RRRR 0000 4567 HHHH | IIII RRRR 0011 8901 HHHH | G C I 0 L | DDD 000 ØØØ Ø12 LLL | DDD 000 000 345 LLL | DDDI 000N 000D 678X LLH | EE XX 00 01 LL | EEEE XXXX 0000 2345 LLLL | EEEE XXXX 0000 6789 LLLL | FFD LLO PPA 01M LLH |
| 01 SMK | 10010 | 0000 | 0000 | 1 | 11 | 0000 | 0000 | 00 | 0000 | 0010 | 000 |
| 02 XIO | 00100 | 1000 | XXXX | 0 | 11 | 0110 | 1010 | 00 | 0000 | 0000 | 001 |
| 03 VIO | 00100 | 1001 | XXXX | 0 | 11 | 0011 | 0010 | 00 | 0000 | 0000 | 111 |
| 04 SBR | 00101 | 0001 | XXXX | 0 | 11 | 0010 | 1111 | 01 | 0000 | 0100 | 001 |
| 05 SB | 00101 | 0000 | XXXX | 0 | 11 | 0000 | 0110 | 01 | 0000 | 0101 | 001 |
| 06 SBI | 00101 | 0010 | XXXX | 0 | 11 | 0000 | 1110 | 01 | 0000 | 0101 | 001 |
| 07 RBR | 00101 | 0100 | XXXX | 0 | 11 | 0010 | 1111 | 01 | 0000 | 0111 | 001 |
| 08 RB | 00101 | 0011 | XXXX | 0 | 11 | 0000 | 0110 | 01 | 0000 | 1000 | 001 |
| 09 RBI | 00101 | 0101 | XXXX | 0 | 11 | 0000 | 1110 | 01 | 0000 | 1000 | 001 |
| 10 TBR | 00101 | 0111 | XXXX | 0 | 11 | 0010 | 1111 | 01 | 0000 | 1010 | 001 |
| 11 TB | 00101 | 0110 | XXXX | 0 | 11 | 0000 | 1000 | 01 | 0000 | 1011 | 001 |
| 12 TBI | 00101 | 1000 | XXXX | 0 | 11 | 0001 | 0000 | 01 | 0000 | 1011 | 001 |
| 13 TSB | 00101 | 1001 | XXXX | 0 | 11 | 0000 | 0110 | 01 | 0000 | 1101 | 001 |
| 14 SVBR | 00101 | 1010 | XXXX | 0 | 11 | 0011 | 0001 | 01 | 0000 | 0100 | 001 |
| 15 RVBR | 00101 | 1100 | XXXX | 0 | 11 | 0011 | 0001 | 01 | 0000 | 0111 | 001 |
| 16 TVBR | 00101 | 1110 | XXXX | 0 | 11 | 0011 | 0001 | 01 | 0000 | 1010 | 001 |
| 17 SLL | 00110 | 0000 | XXXX | 1 | 11 | 0011 | 1111 | 01 | 0001 | 0000 | 000 |
| 18 SRL | 00110 | 0001 | XXXX | 1 | 11 | 0100 | 0001 | 01 | 0001 | 0010 | 000 |
| 19 SRA | 00110 | 0010 | XXXX | 1 | 11 | 0100 | 0011 | 01 | 0001 | 0100 | 000 |
| 20 SLC | 00110 | 0011 | XXXX | 1 | 11 | 0101 | 1001 | 01 | 0001 | 0110 | 000 |
| 21 DSLL | 00110 | 0101 | XXXX | 0 | 11 | 0011 | 0101 | 01 | 0001 | 1000 | 001 |
| 22 DSRL | 00110 | 0110 | XXXX | 1 | 11 | 0100 | 0101 | 01 | 0001 | 1011 | 000 |
| 23 DSRA | 00110 | 0111 | XXXX | 1 | 11 | 0100 | 1001 | 01 | 0001 | 1110 | 000 |
| 24 DSLC | 00110 | 1000 | XXXX | 0 | 11 | 0011 | 0101 | 01 | 0010 | 0001 | 001 |
| 25 SLR | 00110 | 1010 | XXXX | 1 | 11 | 0100 | 1011 | 01 | 0010 | 0101 | 000 |
| 26 SAR | 00110 | 1011 | XXXX | 1 | 11 | 0100 | 1101 | 01 | 0010 | 1111 | 000 |
| 27 SCR | 00110 | 1100 | XXXX | 1 | 11 | 0101 | 0001 | 01 | 1011 | 1101 | 000 |
| 28 DSLR | 00110 | 1101 | XXXX | 1 | 11 | 0101 | 0011 | 01 | 0011 | 0100 | 000 |
| 29 DSAR | 00110 | 1110 | XXXX | 1 | 11 | 0101 | 0101 | 01 | 0100 | 0000 | 000 |
| 30 DSCR | 00110 | 1111 | XXXX | 1 | 11 | 0101 | 0111 | 01 | 0100 | 1000 | 000 |
| 31 JC | 00111 | 0000 | XXXX | 0 | 11 | 0000 | 0110 | 01 | 0101 | 0101 | 001 |
| 32 JCI | 00111 | 0001 | XXXX | 0 | 11 | 0000 | 1110 | 01 | 0101 | 0101 | 001 |
| 33 JS | 00111 | 0010 | XXXX | 0 | 11 | 0000 | 0110 | 01 | 0101 | 0111 | 001 |
| 34 SOJ | 00111 | 0011 | XXXX | 0 | 11 | 0000 | 0110 | 01 | 0101 | 1000 | 001 |
| 35 BR | 00111 | 0100 | XXXX | 1 | 11 | 0011 | 1011 | 01 | 0101 | 1010 | 000 |
| 36 BEZ | 00111 | 0101 | XXXX | 1 | 11 | 0100 | 1111 | 01 | 0101 | 1100 | 000 |
| 37 BLT | 00111 | 0110 | XXXX | 0 | 11 | 0000 | 0001 | 01 | 0101 | 1101 | 000 |
| 38 BEX | 00111 | 0111 | 0000 | 0 | 11 | 0000 | 0001 | 00 | 1010 | 0000 | 100 |
| 39 BLE | 00111 | 1000 | XXXX | 0 | 11 | 0000 | 0001 | 01 | 0101 | 1110 | 000 |
| 40 BGT | 00111 | 1001 | XXXX | 0 | 11 | 0000 | 0001 | 01 | 0101 | 1111 | 000 |
| 41 BNZ | 00111 | 1010 | XXXX | 0 | 11 | 0000 | 0001 | 01 | 0110 | 0000 | 000 |
| 42 BGE | 00111 | 1011 | XXXX | 0 | 11 | 0000 | 0001 | 01 | 0110 | 0001 | 000 |
| 43 LST | 00111 | 1101 | 0000 | 0 | 11 | 0000 | 1100 | 01 | 0110 | 0010 | 001 |
| 44 LSTI | 00111 | 1100 | 0000 | 0 | 11 | 0001 | 0110 | 01 | 0110 | 0010 | 001 |
| 45 SJS | 00111 | 1110 | XXXX | 0 | 11 | 0000 | 0110 | 01 | 0110 | 1001 | 001 |
| 46 URS | 00111 | 1111 | 0000 | 0 | 11 | 0000 | 0001 | 01 | 0110 | 1101 | 000 |
| 47 LR | 01000 | 0001 | XXXX | 0 | 11 | 0000 | 0001 | 01 | 0111 | 0000 | 000 |
| 48 LB | 00000 | 00XX | XXXX | 0 | 11 | 0010 | 1011 | 01 | 0111 | 0001 | 001 |
| 49 LBX | 00100 | 00XX | 0000 | 0 | 11 | 0010 | 0100 | 01 | 0111 | 0001 | 001 |

```
50 LISP 01000 0010 XXXX 0 11 0001 1111 01 0111 0001 001
51 LISN 01000 0011 XXXX 0 11 0010 0001 01 0111 0001 001
52 L    01000 0000 XXXX 0 11 0000 1000 01 0111 0001 001
53 LIM  01000 0101 XXXX 0 11 0001 1010 01 0111 0001 001
54 LI   01000 0100 XXXX 0 11 0001 0000 01 0111 0001 001
55 DLR  01000 0111 XXXX 0 11 0000 0011 01 0111 0100 001
56 DLB  00000 01XX XXXX 0 11 0010 1101 01 0111 0100 001
57 DLBX 00100 00XX 0001 0 11 0010 0110 01 0111 0100 001
58 DL   01000 0110 XXXX 0 11 0000 1010 01 0111 0100 001
59 DLI  01000 1000 XXXX 0 11 0001 0100 01 0111 0100 001
60 LM   01000 1001 XXXX 0 11 0000 0110 01 0111 0110 001
61 EFL  01000 1010 XXXX 0 11 0000 1100 01 0111 1010 001
62 LUB  01000 1011 XXXX 0 11 0000 1000 01 0111 1101 001
63 LUBI 01000 1101 XXXX 0 11 0001 0000 01 0111 1101 001
64 LLB  01000 1100 XXXX 0 11 0000 1000 01 0111 1111 001
65 LLBI 01000 1110 XXXX 0 11 0001 0000 01 0111 1111 001
66 POPM 01000 1111 XXXX 0 11 0000 0001 01 1000 0000 000
67 STB  00000 10XX XXXX 0 11 0001 1001 01 1001 1011 001
68 STBX 00100 00XX 0010 0 11 0001 0010 01 1001 1011 001
69 ST   01001 0000 XXXX 0 11 0000 0110 01 1001 1011 001
70 STI  01001 0100 XXXX 0 11 0000 1110 01 1001 1011 001
71 STC  01001 0001 XXXX 0 11 0000 0110 01 1000 0101 001
72 STCI 01001 0010 XXXX 0 11 0000 1110 01 1000 0101 001
73 MOV  01001 0011 XXXX 0 11 0000 0001 01 1000 0110 000
74 DSTB 00000 11XX XXXX 0 11 0010 1001 01 1001 1010 001
75 DSTX 00100 00XX 0011 0 11 0010 0010 01 1001 1010 001
76 DST  01001 0110 XXXX 0 11 0000 0110 01 1001 1010 001
77 DSTI 01001 1000 XXXX 0 11 0000 1110 01 1001 1010 001
78 SRM  01001 0111 XXXX 0 11 0000 0110 01 1001 0001 001
79 STM  01001 1001 XXXX 0 11 0000 0110 01 1001 0110 001
80 EFST 01001 1010 XXXX 0 11 0000 0110 01 1001 1001 001
81 STUB 01001 1011 XXXX 0 11 0000 0110 01 1001 1100 001
82 SUBI 01001 1101 XXXX 0 11 0000 1110 01 1001 1100 001
83 STLB 01001 1100 XXXX 0 11 0000 0110 01 1001 1110 001
84 SLBI 01001 1110 XXXX 0 11 0000 1110 01 1001 1110 001
85 PSHM 01001 1111 XXXX 0 11 0000 0001 01 1010 0000 000
86 AR   01010 0001 XXXX 0 11 0000 0001 01 1010 0100 000
87 AB   00001 00XX XXXX 0 11 0010 1011 01 1010 0101 001
88 ABX  00100 00XX 0100 0 11 0010 0100 01 1010 0101 001
89 AISP 01010 0010 XXXX 0 11 0001 1111 01 1010 0101 001
90 A    01010 0000 XXXX 0 11 0000 1000 01 1010 0101 001
91 AIM  00100 1010 0001 0 11 0001 1101 01 1010 0101 001
92 INCM 01010 0011 XXXX 0 11 0000 0110 01 1010 0110 001
93 ABS  01010 0100 XXXX 0 11 0000 0001 01 1010 1001 000
94 DABS 01010 0101 XXXX 0 11 0000 0001 01 1010 1011 000
95 DAR  01010 0111 XXXX 0 11 0000 0011 01 1010 1111 001
96 DA   01010 0110 XXXX 0 11 0000 1010 01 1010 1111 001
97 FAR  01010 1001 XXXX 0 11 0000 0011 10 0000 0000 011
98 FAB  00010 00XX XXXX 0 11 0010 1101 10 0000 0000 011
99 FABX 00100 00XX 1000 0 11 0010 0110 10 0000 0000 011
00 FA   01010 1000 XXXX 0 11 0000 1010 10 0000 0000 011
01 EFAR 01010 1011 XXXX 0 11 0000 0001 10 0010 0001 011
02 EFA  01010 1010 XXXX 0 11 0000 1100 10 0010 0001 011
03 FABS 01010 1100 XXXX 0 11 0000 0011 01 1011 0010 101
04 SR   01011 0001 XXXX 0 11 0000 0001 10 0100 1011 000
05 SBB  00001 01XX XXXX 0 11 0010 1011 10 0100 1100 001
06 SBBX 00100 00XX 0101 0 11 0010 0100 10 0100 1100 001
07 SISP 01011 0010 XXXX 0 11 0001 1111 10 0100 1100 001
08 S    01011 0000 XXXX 0 11 0000 1000 10 0100 1100 001
09 SIM  00100 1010 0010 0 11 0001 1101 10 0100 1100 001
10 DECM 01011 0011 XXXX 0 11 0000 0110 10 0100 1101 001
11 NEG  01011 0100 XXXX 0 11 0000 0001 10 0101 0000 000
12 DNEG 01011 0101 XXXX 0 11 0000 0001 10 0101 0001 000
13 DSR  01011 0111 XXXX 0 11 0000 0011 10 0101 0010 001
14 DS   01011 0110 XXXX 0 11 0000 1010 10 0101 0010 001
15 FSR  01011 1001 XXXX 0 11 0000 0011 10 0000 0000 101
16 FSB  00010 01XX XXXX 0 11 0010 1101 10 0000 0000 101
17 FSBX 00100 00XX 1001 0 11 0010 0110 10 0000 0000 101
```

```
18 FS    01011 1000 XXXX 0 11 0000 1010 10 0000 0000 101
19 EFSR  01011 1011 XXXX 0 11 0000 0001 10 0010 0001 101
20 EFS   01011 1010 XXXX 0 11 0000 1100 10 0010 0001 101
21 FMEG  01011 1100 XXXX 0 11 0000 0011 10 0101 0101 101
22 MSR   01100 0001 XXXX 0 11 0000 0001 10 0101 0111 000
23 MISP  01100 0010 XXXX 0 11 0001 1111 10 0101 1000 001
24 MISN  01100 0011 XXXX 0 11 0010 0001 10 0101 1000 001
25 MS    01100 0000 XXXX 0 11 0000 1000 10 0101 1000 001
26 MSIM  00100 1010 0100 0 11 0001 1101 10 0101 1000 001
27 MR    01100 0101 XXXX 0 11 0000 0001 10 0101 1101 000
28 MB    00001 10XX XXXX 0 11 0010 1011 10 0101 1110 001
29 MBX   00100 00XX 0110 0 11 0010 0100 10 0101 1110 001
30 M     01100 0100 XXXX 0 11 0000 1000 10 0101 1110 001
31 MIM   00100 1010 0011 0 11 0001 1101 10 0101 1110 001
32 DMR   01100 0111 XXXX 0 11 0000 0011 10 0110 0011 001
33 DM    01100 0110 XXXX 0 11 0000 1010 10 0110 0011 001
34 FMR   01100 1001 XXXX 0 11 0000 0011 10 0110 1011 001
35 FMB   00010 10XX XXXX 0 11 0010 1101 10 0110 1011 001
36 FMBX  00100 00XX 1010 0 11 0010 0110 10 0110 1011 001
37 FM    01100 1000 XXXX 0 11 0000 1010 10 0110 1011 001
38 EFMR  01100 1011 XXXX 0 11 0000 0001 10 0111 1010 001
39 EFM   01100 1010 XXXX 0 11 0000 1100 10 0111 1010 001
40 DVR   01101 0001 XXXX 0 11 0000 0101 10 1001 0100 001
41 DISP  01101 0010 XXXX 0 11 0001 1111 10 1001 0100 001
42 DISN  01101 0011 XXXX 0 11 0010 0001 10 1001 0100 001
43 DV    01101 0000 XXXX 0 11 0000 1000 10 1001 0100 001
44 DVIM  00100 1010 0110 0 11 0001 1101 10 1001 0100 001
45 DR    01101 0101 XXXX 0 11 0000 0101 10 1010 0110 001
46 DB    00001 11XX XXXX 0 11 0010 1011 10 1010 0110 001
47 DBX   00100 00XX 0111 0 11 0010 0100 10 1010 0110 001
48 D     01101 0100 XXXX 0 11 0000 1000 10 1010 0110 001
49 DIM   00100 1010 0101 0 11 0001 1101 10 1010 0110 001
50 DDR   01101 0111 XXXX 0 11 0000 0011 10 1010 1110 001
51 DD    01101 0110 XXXX 0 11 0000 1010 10 1010 1110 001
52 FDR   01101 1001 XXXX 0 11 0000 0011 11 0101 1001 001
53 FDB   00010 11XX XXXX 0 11 0010 1101 11 0101 1001 001
54 FDBX  00100 00XX 1011 0 11 0010 0110 11 0101 1001 001
55 FD    01101 1000 XXXX 0 11 0000 1010 11 0101 1001 001
56 EFDR  01101 1011 XXXX 0 11 0000 0001 11 0110 1110 001
57 EFD   01101 1010 XXXX 0 11 0000 1100 11 0110 1110 001
58 ORR   01110 0001 XXXX 0 11 0000 0001 00 1011 1111 000
59 ORB   00011 00XX XXXX 0 11 0010 1011 00 1100 0000 001
60 ORBX  00100 00XX 1111 0 11 0010 0100 00 1100 0000 001
61 OR    01110 0000 XXXX 0 11 0000 1000 00 1100 0000 001
62 ORIM  00100 1010 1000 0 11 0001 1101 00 1100 0000 001
63 ANDR  01110 0011 XXXX 0 11 0000 0001 11 1000 1111 000
64 ANDB  00011 01XX XXXX 0 11 0010 1011 11 1001 0000 001
65 ANDX  00100 00XX 1110 0 11 0010 0100 11 1001 0000 001
66 AND   01110 0010 XXXX 0 11 0000 1000 11 1001 0000 001
67 ANDM  00100 1010 0111 0 11 0001 1101 11 1001 0000 001
68 XORR  01110 0101 XXXX 0 11 0000 0001 00 0010 0010 000
69 XOR   01110 0100 XXXX 0 11 0000 1000 00 0010 0011 001
70 XORM  00100 1010 1001 0 11 0001 1101 00 0010 0011 001
71 NR    01110 0111 XXXX 0 11 0000 0001 11 1001 0001 000
72 N     01110 0110 XXXX 0 11 0000 1000 11 1001 0011 001
73 NIM   00100 1010 1011 0 11 0001 1101 11 1001 0011 001
74 FIX   01110 1000 XXXX 0 11 0000 0001 11 1001 0100 000
75 FLT   01110 1001 XXXX 0 11 0000 0001 11 1001 1101 000
76 EFIX  01110 1010 XXXX 0 11 0000 0001 11 1001 1111 000
77 EFLT  01110 1011 XXXX 0 11 0000 0011 11 1010 1110 001
78 XBR   01110 1100 0000 0 11 0000 0001 01 1011 1001 000
79 XWR   01110 1101 XXXX 0 11 0000 0001 01 1011 1010 000
80 CR    01111 0001 XXXX 0 11 0000 0001 00 0111 1100 000
81 CB    00011 10XX XXXX 0 11 0010 1011 10 0100 1001 001
82 CBX   00100 00XX 1100 0 11 0010 0100 10 0100 1001 001
83 CISP  01111 0010 XXXX 0 11 0001 1111 10 0100 1001 001
84 CISN  01111 0011 XXXX 0 11 0010 0001 10 0100 1001 001
85 C     01111 0000 XXXX 0 11 0000 1000 10 0100 1001 001
```

```
86 CIM  00100 1010 1010 0 11 0001 1101 10 0100 1001 001
87 CBL  01111 0100 XXXX 0 11 0000 0110 00 1000 1100 001
88 DCR  01111 0111 XXXX 0 11 0000 0011 01 0000 0000 001
89 DC   01111 0110 XXXX 0 11 0000 1010 01 0000 0000 001
90 FCR  01111 1001 XXXX 0 11 0000 0011 10 0000 0000 111
91 FCB  00011 11XX XXXX 0 11 0010 1101 10 0000 0000 111
92 FCBX 00100 00XX 1101 0 11 0010 0110 10 0000 0000 111
93 FC   01111 1000 XXXX 0 11 0000 1010 10 0000 0000 111
94 EFCR 01111 1011 XXXX 0 11 0000 0001 10 0010 0001 111
95 EFC  01111 1010 XXXX 0 11 0000 1100 10 0010 0001 111
96 NBPT 01111 1111 XXXX 0 11 0000 0001 00 1001 0100 000
97 BF3I 00100 1111 11XX 0 11 0000 1110 11 1011 0100 001
98 BF3D 00100 1111 01XX 0 11 0000 0110 11 1011 0100 001
99 CLIR 10010 0000 0001 1 11 0000 0000 00 0000 0100 000
00 RPI  10010 0000 0100 1 11 0000 0000 00 0000 0110 000
01 SPI  10010 0000 0101 1 11 0000 0000 00 0000 1010 010
02 WSW  10010 0000 1110 1 11 0000 0000 00 0000 1100 000
03 OTA  10100 0000 1010 1 11 0010 0000 00 0110 1100 000
04 OTB  10100 0000 1110 1 11 0010 1000 00 0110 1111 000
05 RMK  11010 0000 0000 1 11 0000 0000 00 0001 0100 000
06 RPIR 11010 0000 0100 1 11 0000 0000 00 0001 0110 000
07 RSW  11010 0000 1110 1 11 0000 0000 00 0001 1000 000
08 RCFR 11010 0000 1111 1 11 0000 0000 00 0001 1010 000
09 ITA  11100 0000 1010 1 11 0000 0100 00 0001 1100 000
10 ITB  11100 0000 1110 1 11 0000 0010 00 0001 1110 000
11 GO   10100 0000 1011 1 11 0001 1000 00 0110 1110 000
12 ENBL 10010 0000 0010 1 11 0100 1000 00 0110 1110 010
13 DSBL 10010 0000 0011 1 11 0000 1000 00 0110 1110 000
14 RNS  10010 0000 1010 1 11 0011 0000 00 0110 1110 000
15 DMAE 10100 0000 0110 1 11 0101 0000 00 0110 1110 000
16 DMAD 10100 0000 0111 1 11 0001 0000 00 0110 1110 000
17 TAS  10100 0000 1000 1 11 0010 0000 00 0110 1110 000
18 TAH  10100 0000 1001 1 11 0110 0000 00 0110 1110 000
19 TBS  10100 0000 1100 1 11 0010 1000 00 0110 1110 000
20 TBH  10100 0000 1101 1 11 0110 1000 00 0110 1110 000
21 RES1 XXXXX XXXX XXXX 0 11 0000 0000 00 0000 0000 000
22 RES2 XXXXX XXXX XXXX 0 11 0000 0000 00 0000 0000 000
23 RES3 XXXXX XXXX XXXX 0 11 0000 0000 00 0000 0000 000
24 RES4 XXXXX XXXX XXXX 0 11 0000 0000 00 0000 0000 000
```

BRANCH PLA TRUTH TABLE, APPENDIX C

```
                    ←————————— IN —————————→  ←OUT→
          NNNNNN SSSS DDDD C AA AESAA EESS IVB  BBB PAC
          BBBBBB TTTT SSSS N LL LFFNN OVIT RIE  RRR ELS
          SSSSSS 0000 TTTT T SZ OOOMM VDGK OOX  PPP XBJ
          012345 0123 0123 1 GR VRR12 FFNY OBB  012 TRP
          HHHHHH HHHH HHHH H HH HHHHH HHHH HHH  LLL LLL

001 A  B  000000 XXXX XXXX X XX XXXXX XXXX XXX  000 000
002 B  B  000001 XXXX XXXX X 0X XXXXX XXXX XXX  101 010
003 C  B  000001 XXXX XXXX X X1 XXXXX XXXX XXX  101 010
004 D  B  000010 XXXX XXXX X X0 XXXXX XXXX XXX  101 010
005 E  B  000011 XXXX XXXX X 1X XXXXX XXXX XXX  101 010
006 F  B  000100 XXXX XXXX X X1 XXXXX XXX0 XXX  101 010
007 G  B  000101 XXXX XXXX X 10 XXXXX XXXX XXX  101 010
008 H  B  000110 XXXX XXXX X X1 XXXXX XXXX XXX  101 010
009 I  B  000111 XXXX XXXX X 0X XXXXX XXXX XXX  101 010
010 J  B  001000 X010 XXXX X XX XXXXX XXXX XXX  101 000
011 K  B  001001 X100 XXXX X XX XXXXX XXXX XXX  101 000
012 L  B  001001 X001 XXXX X XX XXXXX XXXX XXX  101 000
013 M  B  001010 X100 XXXX X XX XXXXX XXXX XXX  101 000
014 N  B  001010 X010 XXXX X XX XXXXX XXXX XXX  101 000
015 O  B  001011 X001 XXXX X XX XXXXX XXXX XXX  101 000
016 P  B  001100 XXXX XXXX X XX XXXXX X1XX XXX  101 010
017 Q  B  001101 XXXX XXXX X XX XXXXX 1XXX XXX  101 010
018 R  B  001110 XXXX XXXX X XX XXXXX 0XXX XXX  101 010
```

```
019 S    B  001111 XXXX XXXX X XX 1XXXX XXXX XXX   101 010
020 T    B  010000 XXXX XXXX X XX 0XXXX XXXX XXX   101 010
021 U    B  010001 XXXX XXXX X XX XXXXX XXXX 1XX   101 000
022 V    B  010010 XXXX XXXX X XX XXXXX XX0X XXX   101 010
023 W    B  010011 XXXX XXXX X XX XXXXX XX1X XXX   101 010
024 X    B  010100 XXXX XXXX X XX XX1XX XXXX XXX   101 010
025 Y    B  010101 XXXX XXXX X XX X1XXX XXXX XXX   101 010
026 C1   B  010110 XXXX XXXX 0 XX XXXXX XXXX XXX   101 000

028 C3   B  011000 XXXX XXXX X XX XXXXX XXXX X1X   101 000
029 C4   B  011001 XXXX XXXX X XX XXXXX XXXX XX0   101 000

034 C9   B  100000 XXXX XXXX X XX XXX0X XXXX XXX   101 010
035 C10  B  100000 XXXX XXXX X XX XXX1X XXXX XXX   000 110
036 C11  B  100001 XXXX XXXX X XX XXXX0 XXXX XXX   101 010
037 C12  B  100001 XXXX XXXX X XX XXXX1 XXXX XXX   000 110
038 C13  B  100010 XXXX XXXX X X0 XXXXX XXXX XXX   101 010
039 C14  B  100010 XXXX XXXX X X1 XXXXX XXXX XXX   000 110
040 C15  B  100011 X010 XXXX X XX XXXXX XXXX XXX   101 000
041 C16  B  100011 X000 XXXX X XX XXXXX XXXX XXX   000 100
042 C17  B  100011 XXX1 XXXX X XX XXXXX XXXX XXX   000 100
043 C18  B  100011 X1XX XXXX X XX XXXXX XXXX XXX   000 100
              ←————————— IN ——————————→  ←OUT→
044 C19  B  100100 X100 XXXX X XX XXXXX XXXX XXX   101 000
045 C20  B  100100 X001 XXXX X XX XXXXX XXXX XXX   101 000
046 C21  B  100100 X000 XXXX X XX XXXXX XXXX XXX   000 100
047 C22  B  100100 XX1X XXXX X XX XXXXX XXXX XXX   000 100
048 C23  B  100100 X101 XXXX X XX XXXXX XXXX XXX   000 100
049 C24  B  100101 X100 XXXX X XX XXXXX XXXX XXX   101 000
            NNNNNN SSSS DDDD C AA AESAA EESS IVB   BBB PAC
            BBBBBB TTTT SSSS N LL LFFNN OVIT RIE   RRR ELS
            SSSSSS 0000 TTTT T SZ OOOMM VDGK OOX   PPP XBJ
            012345 0123 0123 1 GR VRR12 FFNY OBB   012 TRP
            HHHHHH HHHH HHHH H HH HHHHH HHHH HHH   LLL LLL
050 C25  B  100101 X0XX XXXX X XX XXXXX XXXX XXX   000 100
051 C26  B  100101 X101 XXXX X XX XXXXX XXXX XXX   000 100
052 C27  B  100101 XX1X XXXX X XX XXXXX XXXX XXX   000 100
053 C28  B  100110 X100 XXXX X XX XXXXX XXXX XXX   000 100
054 C29  B  100110 X010 XXXX X XX XXXXX XXXX XXX   101 000
055 C30  B  100110 X000 XXXX X XX XXXXX XXXX XXX   101 000
056 C31  B  100110 XXX1 XXXX X XX XXXXX XXXX XXX   000 100
057 C32  B  100110 X110 XXXX X XX XXXXX XXXX XXX   000 100
058 C33  B  100111 X001 XXXX X XX XXXXX XXXX XXX   101 000
059 C34  B  100111 X000 XXXX X XX XXXXX XXXX XXX   000 100
060 C35  B  100111 XX1X XXXX X XX XXXXX XXXX XXX   000 100
061 C36  B  100111 X1XX XXXX X XX XXXXX XXXX XXX   000 100
062 C37  B  101000 X010 XXXX X XX XXXXX XXXX XXX   101 000
063 C38  B  101000 X001 XXXX X XX XXXXX XXXX XXX   101 000
064 C39  B  101000 X000 XXXX X XX XXXXX XXXX XXX   000 100
065 C40  B  101000 X011 XXXX X XX XXXXX XXXX XXX   000 100
066 C41  B  101000 X1XX XXXX X XX XXXXX XXXX XXX   000 100
067 D1   B  101001 XXXX XXXX 0 XX XXXXX XXXX XXX   101 000
068 D2   B  101001 XXXX XXXX 1 XX XXXXX XXXX XXX   000 100
069 D3   B  101011 1XXX 1XXX X XX XXXXX XXXX XXX   000 001
070 D4   B  101011 X1XX X1XX X XX XXXXX XXXX XXX   000 001
071 D5   B  101011 XX1X XX1X X XX XXXXX XXXX XXX   000 001
072 D6   B  101011 XXX1 XXX1 X XX XXXXX XXXX XXX   000 001
073 D7   B  101011 XXXX X111 X XX XXXXX XXXX XXX   000 001
074 D8   B  101100 XXXX XXXX X X1 XXXXX XXXX XXX   000 110
075 D9   B  101101 XXXX XXXX X X1 XXXXX XXXX XXX   000 110
076 D10  B  101110 XXXX XXXX X 10 XXXXX XXXX XXX   000 110
077 D11  B  101111 XXXX XXXX X X0 XXXXX XXXX XXX   000 110
078 D12  B  111100 XXXX XXXX X XX XXXXX XXXX X1X   101 000
079 D13  B  111100 XXXX XXXX X XX XXXXX XXXX X0X   111 000
```

```
080 D14      B   111101 XXXX XXXX X XX XXXXX XXXX XXX   110 000
081 D15      B   111110 XXXX XXXX X XX XXXXX XXXX XXX   101 000
082 D16      B   111111 XXXX XXXX X XX XXXXX XXXX XXX   000 100
```

What is claimed is:

1. In a microprocessor having an ALU and an information bus:
   a single programmable logic array containing a plurality of microcode addresses for different types of operations;
   an instruction register connected to provide inputs to said programmable logic array;
   a multiplexer connected to provide inputs to said instruction register, said multiplexer receiving inputs from an external console connected to said information bus and from said ALU.

2. The microprocessor of claim 1 in which the different types of operations are stored instructions or console commands and wherein said multiplexer selects the inputs to said instruction register from said information bus.

3. The microprocessor of claim 2 in which every instruction recognized by said microprocessor is mapped into predetermined microcode addresses in said programmable logic array which are divided into an execution address portion and a derived operand address calculation portion, where only some of the instructions utilize the derived operand address calculation portion, and wherein console command instructions are mapped to the unused derived operand address calculation portions of other instructions.

4. The microprocessor of claim 1 in which said programmable logic array also contains control commands for operations free of data transfer, said control commands being stored in unused derived operand address portions.

5. The microprocessor of claim 1 further comprising means for self-generating input/output instructions.

6. The microprocessor of claim 5 wherein said means for self-generating includes means for addition of a constant to an operand brought in from external memory and for causing the result to be fed back into said instruction register through said multiplexer.

* * * * *